(12) United States Patent
Edelson et al.

(10) Patent No.: US 7,905,813 B2
(45) Date of Patent: Mar. 15, 2011

(54) ELECTRONICALLY CONTROLLED ENGINE GENERATOR SET

(75) Inventors: Jonathan Sidney Edelson, Portland, OR (US); Rochel Geller, Ramat Beit Shemesh Aleph (IL)

(73) Assignee: Borealis Technical Limited (GI)

( * ) Notice: Subject to any disclaimer, the term of this patent is extended or adjusted under 35 U.S.C. 154(b) by 943 days.

(21) Appl. No.: 10/593,750

(22) PCT Filed: Mar. 22, 2004

(86) PCT No.: PCT/US2004/008974
§ 371 (c)(1), (2), (4) Date: Sep. 21, 2006

(87) PCT Pub. No.: WO2005/096492
PCT Pub. Date: Oct. 13, 2005

(65) Prior Publication Data
US 2008/0238108 A1    Oct. 2, 2008

Related U.S. Application Data

(60) Continuation-in-part of application No. 09/675,082, filed on Sep. 28, 2000, now Pat. No. 6,825,575, which is a continuation-in-part of application No. 10/723,010, filed on Nov. 26, 2003, now Pat. No. 6,831,430, which is a division of application No. 09/713,654, filed on Nov. 15, 2000, now Pat. No. 6,657,334, which is a continuation-in-part of application No. 10/132,936, filed on Apr. 26, 2002.

(60) Provisional application No. 60/156,402, filed on Sep. 28, 1999, provisional application No. 60/242,622, filed on Oct. 23, 2000, provisional application No. 60/286,862, filed on Apr. 26, 2001.

(51) Int. Cl.
*B60W 10/04* (2006.01)
*B60W 10/10* (2006.01)
(52) U.S. Cl. ......................................... 477/110; 477/115
(58) Field of Classification Search .................. 477/2, 3, 477/107, 108, 111, 115, 120, 110; 290/40 A, 290/40 C; 180/65.21, 65.225, 65.25, 65.7, 180/65.26
See application file for complete search history.

(56) References Cited

U.S. PATENT DOCUMENTS

| | | | |
|---|---|---|---|
| 3,101,627 | A | 8/1963 | Linsley et al. |
| 3,612,892 | A | 10/1971 | Nobile et al. |
| 3,701,556 | A | 10/1972 | Richmond |
| 3,705,721 | A | 12/1972 | Lulay et al. |

(Continued)

FOREIGN PATENT DOCUMENTS

JP          02169825 A    6/1990

*Primary Examiner* — David D Le

(57) ABSTRACT

An apparatus for controlling the power output of an unthrottled engine has a variable gear ratio transmission connected between a mechanical load and the engine, and it has a controller for controlling the torque load on the engine, according to the power output required. The controller measures the torque output of the unthrottled engine at the power output required, and sets the gear ratio of the transmission to produce a torque load on the engine equal to the torque output of the engine. This means the unthrottled engine will reach an equilibrium with the mechanical load at the required power output. Controlling the unthrottled engine in this way involves receiving a signal describing the power output requirement, varying a gear ratio of the transmission, and establishing a torque equilibrium between the load and the engine.

17 Claims, 22 Drawing Sheets

U.S. PATENT DOCUMENTS

| | | |
|---|---|---|
| 3,791,473 A | 2/1974 | Rosen |
| 3,812,411 A | 5/1974 | Johnson et al. |
| 3,878,400 A | 4/1975 | McSparran |
| 3,970,858 A | 7/1976 | Rist et al. |
| 4,173,119 A | 11/1979 | Greune et al. |
| 4,184,083 A | 1/1980 | Takeuchi |
| 4,253,308 A | 3/1981 | Eggenberger et al. |
| 4,307,690 A | 12/1981 | Rau et al. |
| 4,367,708 A | 1/1983 | Nakamura et al. |
| 4,401,938 A | 8/1983 | Cronin |
| 4,455,492 A | 6/1984 | Guelpa |
| 4,455,525 A | 6/1984 | Morishita et al. |
| 4,498,016 A | 2/1985 | Earleson et al. |
| 4,511,807 A | 4/1985 | Somerville |
| 4,563,630 A | 1/1986 | Woodward et al. |
| 4,629,968 A | 12/1986 | Butts et al. |
| 4,661,761 A | 4/1987 | Katsumata |
| 4,668,872 A | 5/1987 | Lerouge et al. |
| 4,682,044 A | 7/1987 | Hotate et al. |
| 4,699,097 A | 10/1987 | Tanaka et al. |
| 4,743,812 A | 5/1988 | Dishner |
| 4,774,858 A * | 10/1988 | Ganoung ................. 477/32 |
| 4,777,425 A | 10/1988 | MacFarlane |
| 4,789,817 A | 12/1988 | Asakura et al. |
| 4,877,273 A | 10/1989 | Wazaki et al. |
| 4,888,493 A | 12/1989 | Fluegel |
| 4,994,684 A | 2/1991 | Lauw et al. |
| 5,006,781 A | 4/1991 | Schultz et al. |
| 5,020,491 A | 6/1991 | Mashino |
| 5,028,804 A | 7/1991 | Lauw |
| 5,056,487 A | 10/1991 | Yamakado et al. |
| 5,080,059 A | 1/1992 | Yoshida et al. |
| 5,115,183 A | 5/1992 | Kyoukane et al. |
| 5,117,931 A | 6/1992 | Nishida |
| 5,144,220 A | 9/1992 | Iwatani et al. |
| 5,198,698 A | 3/1993 | Paul et al. |
| 5,256,959 A | 10/1993 | Nagano et al. |
| 5,264,764 A | 11/1993 | Kuang |
| 5,311,063 A | 5/1994 | Hubler |
| 5,345,154 A | 9/1994 | King |
| 5,473,228 A | 12/1995 | Nii |
| 5,552,640 A | 9/1996 | Sutton et al. |
| 5,587,647 A | 12/1996 | Bansal et al. |
| 5,589,743 A | 12/1996 | King |
| 5,608,308 A | 3/1997 | Kiuchi et al. |
| 5,608,310 A | 3/1997 | Watanabe |
| 5,614,809 A | 3/1997 | Kiuchi et al. |
| 5,621,304 A | 4/1997 | Kiuchi et al. |
| 5,691,576 A | 11/1997 | Minks |
| 5,703,410 A | 12/1997 | Maekawa |
| 5,730,094 A | 3/1998 | Morris |
| 5,751,069 A | 5/1998 | Rajashekara et al. |
| 5,763,977 A | 6/1998 | Shimasaki et al. |
| 5,832,896 A | 11/1998 | Phipps |
| 5,942,879 A * | 8/1999 | Ibaraki ................. 322/16 |
| 5,959,420 A | 9/1999 | Boberg et al. |
| 6,037,672 A | 3/2000 | Grewe |
| 6,051,951 A | 4/2000 | Arai et al. |
| 6,054,844 A | 4/2000 | Frank |
| 6,330,873 B1 | 12/2001 | Letang et al. |
| 6,464,026 B1 | 10/2002 | Horsley et al. |
| 6,809,429 B1 | 10/2004 | Frank |

* cited by examiner

*Figure 1h*
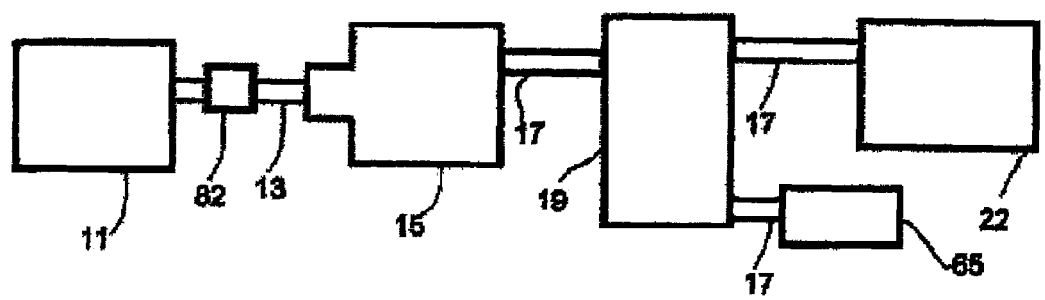
*Figure 9a*   *PRIOR ART*
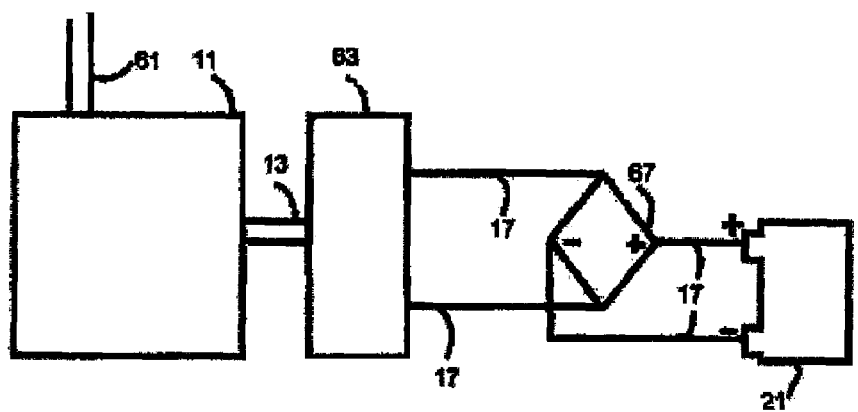

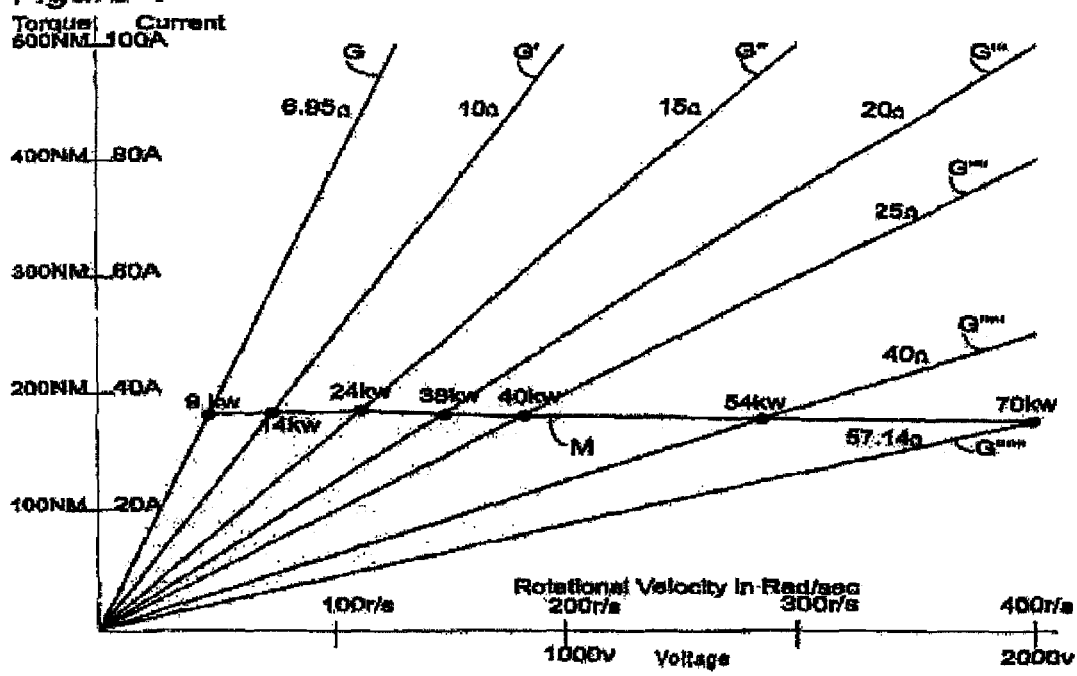
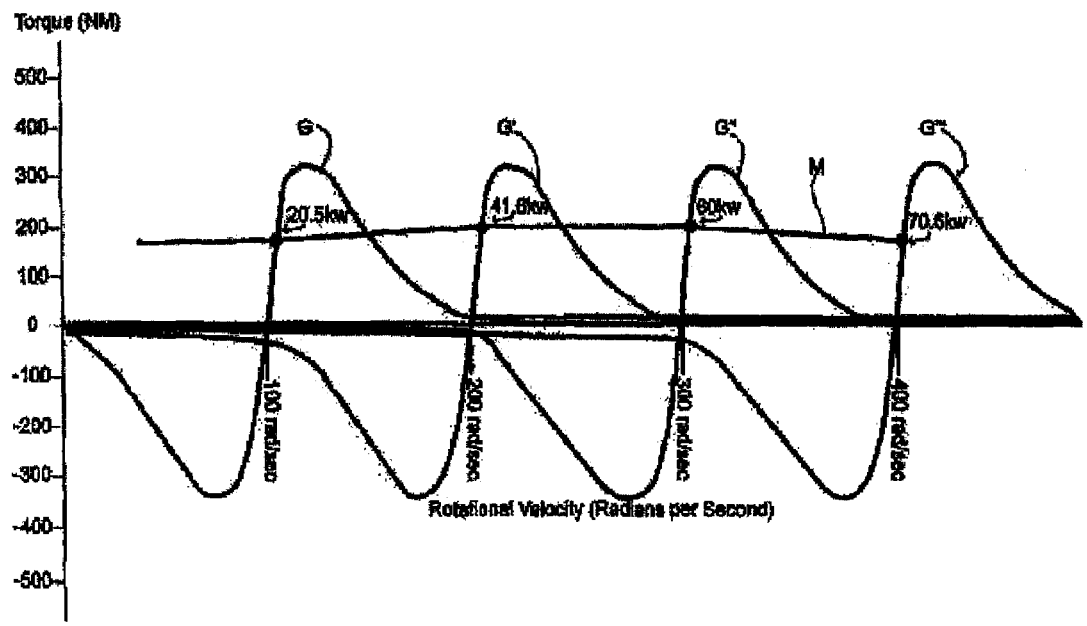

Figure 12a step 0 is there a difference between required total power output and total power output?

yes go to step 1 no remain at step 0 step 1 is required total power output greater than total power output?

yes go to step 2 no go to step 3 step 2 increase transmission ratio and wait predetermined time period. Return to step 0 step 3 decrease transmission ratio and wait predetermined time period. Return to step 0

Figure 12b step 0 is there a difference between required total power output and total power output?

yes go to step 1 no remain at step 0 step 1 is required total power output greater than total power output?

yes go to step 2 no go to step 5 step 2 is the difference greater than x?

yes go to step 3 no go to step 4 step 3 increase transmission torque/speed ratio by Group of Gears and wait predetermined time period. Return to step 0 step 4 increase transmission torque/speed ratio by One Gear and wait predetermined time period. Return to step 0 step 5 is the difference greater than x?

yes go to step 6 no go to step 7 step 6 decrease transmission torque/speed ratio by Group of Gears and wait predetermined time period. Return to step 0 step 7 decrease transmission torque/speed ratio by One Gear and wait predetermined time period. Return to step 0

S=1

S=2

S=3

Fundamental

Third Harmonic

Fifth Harmonic

Seventh Harmonic

ELECTRONICALLY CONTROLLED ENGINE GENERATOR SET

CROSS-REFERENCE TO RELATED APPLICATION

The application is the U.S. national stage application of International Application PCT/US04/08974, filed Mar. 22, 2004, which international application was published on Oct. 16, 2003, as International Publication WO 2005/096492 in the English language. The International Application is a Continuation in Part of application Ser. No. 09/675,082 filed Sep. 28, 2000 now U.S. Pat. No. 6,825,575, which claims the benefit of U.S. Provisional Application No. 60/156,402, hereby incorporated herein by reference, filed Sep. 28, 1999. This application is also a Continuation in Part of application Ser. No. 10/723,010, filed Nov. 26, 2003 now U.S. Pat. No. 6,831,430, which is a division of application Ser. No. 09/713,654 filed Nov. 15, 2000, now issued as U.S. Pat. No. 6,657,334, which claims the benefit of U.S. Provisional Application No. 60/242,622, hereby incorporated herein by reference, filed 23 Oct. 2000. This application is also a Continuation in part of application Ser. No. 10/132,936, filed Apr. 26, 2002, which claims the benefit of U.S. Provisional Application No. 60/286,862, hereby incorporated herein by reference, filed 26 Apr. 2001.

TECHNICAL FIELD

The present invention is related to the field of electric power production using combustion engines. It is further related to methods of control of electric power systems responding to load changes.

BACKGROUND ART

In an engine/generator system, the fuel supply to the prime mover is directly controlled by an actuator means, generally with a throttle or injection pump. Fuel supply adjustment is a method of adjusting the torque/speed characteristics of the prime mover. As the throttle is closed or the fuel injection setting reduced, the torque produced at a given rotational velocity is similarly reduced, causing the system to slow down, while wide open throttle maximizes the torque and power output at a given speed. In conventional engine/generator systems, the speed of the system is controlled by altering the torque/speed characteristic of the prime mover. This results in engine inefficiency.

An additional cause of engine inefficiency is friction. As the piston moves through the cylinder, work must be done because of friction between the piston and the cylinder. Every time the piston moves through a stroke, some energy is lost, regardless of engine power output for that piston stroke. The greater the energy output per piston stroke, the less energy lost to friction as compared to energy output.

Other sources of engine inefficiency are parasitic loads such as oil pumps and the like, which vary with engine speed, but not power output. The higher the RPM of the engine, the more energy lost to these loads, regardless of actual engine power output. Parasitic loads and cylinder friction mean that for constant power output, lower RPM will generally be more efficient.

A partial solution for inefficiency during low demand is found in systems comprising an energy storage unit, such as a battery, in addition to the engine-generator system. An example for such system is the Hybrid Electric Vehicle (HEV), in which the solution for the inefficient low load mode is simply to turn the engine and generator off. The power demand is supplied by the battery until a higher demand is required or until the battery reaches a low energy level. The engine and the generator are then turned on to recharge the battery and to supply power, directly or via the battery, to the vehicle.

Attempts to deal with engine inefficiency, such as with the HEVs have not been successful. A drawback of HEVs is that a substantial amount of restarting of the engine and generator is required, which releases fumes and is a particularly inefficient period in engine operation. Secondly, when the engine is turned off, a great amount of inertial energy is lost. This results in a waste of energy, invested in regaining the inertial energy, when the engine is restarted. Third, no currently available energy storage system is perfect; more energy must be supplied to the energy storage system than is later removed as useable electricity, with the difference being lost as heat. Energy storage systems also have limited life, in terms of number of charge/discharge cycles, and aging due to deep discharge. Even in the hybrid electric vehicle, there is substantial utility to a wide range of generator power output, providing efficiency can be maintained over this range.

Methods for the conversion of electrical power at a given voltage, current, and frequency, to electrical power at a different voltage, current, or frequency are well known in the art. The simplest device, the transformer, is used to trade voltage for current with little loss of power to inefficiency.

Other devices convert input electrical power to an output electrical power via an intermediate mechanical form, or from alternating current to alternating current of different characteristics via intermediate direct current. Power electronics are devices that usually contain transistors or similar components, and use switches to vary the electrical characteristics of their output, according to requirements. These include many variations, some of which are the bipolar transistor, the darlington pair of transistors, the field effect transistor, the pulse width modulated DC controller, the Silicon Controlled Rectifier, the DC link converter, the insulated gate bipolar transistor, the MOS controlled thyristor, as well as optically driven devices, vacuum devices, gas filled devices, and even mechanical devices. Power electronic devices can often act as variable pseudo-resistance, that is they can create voltage/current output relationships without dissipating power in the fashion of an actual resistor. The Silicon Controlled Rectifier can control how much AC power is delivered to a load.

Electric control systems for generators are well known in the field of the art. Output of a desired frequency, voltage and current can either be achieved by controlling the operational state of the generator, or by converting the native output power of the generator to the desired voltage, frequency, current, or otherwise characterized output power.

Output characteristics of a generator are not independent, and are related by load considerations and generator internal characteristics. For example, a DC generator feeding a resistive load, when under circumstances that increase the output voltage of the generator, will also experience an increase in current flow. Often various changes in output are described with other output aspects held constant.

Systems involving an engine, for example a heat engine, providing output mechanical power for a load are common in the art. Often, between the engine and the load is a transmission, or mechanical advantage coupling, with a variety of possible gear ratios. The load may be a mechanical load, such as a set of vehicle wheels, or a generator, which converts rotary mechanical power into electricity. The output mechanical power of the engine is applied to the mechanical load after the torque/speed ratio of the mechanical power has been modified by the transmission.

Engine-generator systems, in which an engine is directly mechanically linked to a generator, and providing the generator with power in the forms of torque and speed, turn at a fixed speed relation. Torque supplied by the engine is not necessarily equal to the torque absorbed by the generator. If, due to some perturbation, the generator is unable to absorb all the torque that the prime mover provides, a potentially dangerous situation may arise, for the system is not operating in equilibrium. Usually, it is the speed of the engine, and with it, the speed of the generator, which will change when the system is not operating in equilibrium, and in the case mentioned above, the speed of the system will probably increase. Sometimes the fixed mechanical linkage between the engine and generator includes some sort of gearing or mechanical advantage. In this case, then when the system is operating in equilibrium, there will be an equilibrium between the individual linkages between motor and gearing mechanism, and between gearing mechanism and generator.

The term "torque load", in the course of this specification, is used to mean the amount of torque that the generator absorbs from the engine or other prime mover, to which it is connected. It is also described as the torque in the direction counter to rotation that the generator applies to a transmission with the prime mover. A negative torque load would refer to a torque in the direction of rotation (i.e. the generator acting as a motor). The "torque of the generator" refers to the torque applied by the generator to the prime mover, in the direction of, or counter to, rotation. The prime mover in most cases may be an engine, but the term engine is used in the course of this specification to also refer to other prime movers that behave similarly to engines, with the characteristics that will be henceforth described.

An engine, supplying mechanical power to a load, such as a set of vehicle wheels, produces a torque, in the direction of rotation of a common shaft between the engine and the load. The load (in most cases) provides a resistive force to the same shaft, usually in the direction counter to rotation. This is termed the torque load of the mechanical load, and is usually a negative torque relative to the torque output of the engine. However, in the case where the mechanical load is a motor/generator, during the periods in which the motor/generator operates as a motor, it will provide torque to the shaft in the direction of rotation. This is also termed a torque load of the mechanical load, but it is a negative torque load. All forces other than those that originate with the engine, that have an effect on the torque of the output shaft of the engine, are termed the 'torque load'. The torque load combines any parasitic loads present in the transmission with the mechanical output loads placed upon the transmission, as reflected by the gear ratio of the transmission.

It is the combined effect of the torque output of the engine together with the torque load that determines whether the shaft accelerates, decelerates or continues at a steady speed. When the shaft accelerates or decelerates, so does the unthrottled engine, and usually, so does the engine's combustion rate.

Each type of engine has a characteristic torque/speed relationship. Similarly, each transmission ratio has a characteristic torque/speed relationship. Also, each type of mechanical load has a characteristic torque load/speed relationship. Furthermore, the operating conditions may affect the torque/speed relationship of the engine, transmission, or mechanical load. The torque/speed characteristics of these components characterize their operating regime.

The torque/speed characteristics of engines, transmissions and mechanical loads, depend on control states and operating conditions. For example, throttling an engine changes the engine's torque/speed characteristic; changing the gear ratio changes the transmission's torque/speed characteristic; in the case where the mechanical load is an AC generator, then changing the frequency of the generator changes the mechanical load's torque-load/speed characteristic. Operating conditions that may affect the torque-load/speed relationship of the load include various gradients of an incline, in the example case where the mechanical load is vehicle wheels.

The rotational velocity at which the mechanical load receives the mechanical output of the engine is not necessarily equal to the rotational velocity the engine is outputting since this is first modified by the transmission. The term "transmission speed" as used herein means the speed which the mechanical load is provided with from the engine, but as reflected through the transmission. The transmission speed often affects the torque of the mechanical load.

The speed of the mechanical load is locked to the speed of the engine, although these are not necessarily identical, since a transmission interacts between them.

An unthrottled engine has the following characteristics:

When the torque load is equal to the engine output torque, there will be an equilibrium, and the unthrottled engine will maintain a steady speeds.

When the torque load is greater than the engine torque output, there will be a net torque on the engine side of the transmission that forces the unthrottled engine to decelerate.

When the torque load is less than the engine output torque, then there will be a net torque on the engine side of the transmission that forces the engine to accelerate.

As the unthrottled engine decelerates, its rate of combustion decreases, and its power output is reduced. As the unthrottled engine is forced to accelerate, its combustion rate increases and its power output is increased.

An example of how torque equilibrium, or lack thereof, can affect speed, is shown in starting an engine-induction generator system, in which the induction generator is supplying electricity to a fixed frequency, fixed voltage, electrical load. When an engine-generator system is started, the speeds of the engine and generator are in fixed relation to each other, but the torques of the individual parts of the system are not. The engine is producing a torque in the direction of rotation, and for equilibrium, the generator would have to be producing an equal torque in the direction counter to rotation. However, since the speed is so low, the generator does not yet generate electricity. In fact, due to the low speeds, the generator absorbs electricity (from another power source) and produces torque in the same direction as rotation. Therefore, the torque produced by the engine is not absorbed by the generator, resulting in system speed acceleration. However, as high enough speeds are reached, the generator begins to generate electricity, and to absorb the torque produced by the engine. There is (in a matched system) at least one equilibrium point, at which the torque output of the engine matches the torque absorbed by the generator, whereupon the system ceases acceleration, and a steady speed is maintained. When changes in system output are required, these are usually made by throttling the engine, or similar methods. Throttling acts to change the torque/speed characteristics of the engine. When throttling is used, the system will often change speed to a different torque equilibrium point, due to the new engine characteristics.

In all examples of engine-generator systems, each of the engine and the generator will have a characteristic that describes how its torque changes with speed. These characteristics will determine the equilibrium speed of the combined engine/generator system.

The generator torque/speed characteristics will depend upon the type of generator it is, its level of excitation, and the load to which it is supplying electricity. Induction generators, when attached to electrical loads having fixed voltage, fixed frequency characteristics, are known to be quite stable, being that within the speed range at which they generate electricity, they have a steep torque requirement relative to their speed requirement. Thus an accidental speed change in a system involving an induction generator will be immediately followed by a large torque change, which normally causes the system to return to equilibrium speed.

Note that in the pathological condition of the engine providing greater torque output than the maximum torque load of the generator, system speed will continue to increase until the internal friction of the engine prevents further speed increase, or until the system fails. This is known as a runaway condition. The maximum torque of an induction generator is limited by the load current. A sudden reduction in load will reduce the maximum torque load of the induction generator, and may cause a runaway condition.

In AC induction machines a method may be applied for the alternation between generator and motor modes. The synchronous speed, the speed of the rotating magnetic field, of the induction machine is determined by the number of poles of the machine and the frequency of the applied AC power. The synchronous speed is given by the formula: $Ns=120\ f/P$ where: Ns is the Synchronous speed in rotations per minute; f is the frequency of the power supply in cycles per second; and P is the number of poles for which the machine is is wound.

In induction generators the actual speed of the rotor is faster than the synchronous speed of the rotating field. In induction motors the actual speed of the rotor is lower than the synchronous speed of the rotating field. In fact, the motor and the generator are essentially the same machine with the main difference being in their actual speed in relation to their synchronous speed; induction machines that are marketed as motors are often placed into service as generators. Although a generator is supplying real electrical power to a load, it is consuming reactive power for excitation purposes. If an induction machine does not have a source of excitation power, then it will not develop a rotating magnetic field, and will not act as a generator.

By controlling the frequency of the input power to the excitation, a controller may increase or decrease the synchronous speed of the machine. For a given rotor RPM, the control may increase or decrease the synchronous speed to be faster or slower than the rotor RPM thereby determining the function of the induction machine as a generator or a motor.

U.S. Pat. No. 6,054,844 to Frank describes a system in which the torque applied by a motor/generator to the engine is calculated and applied to force the engine torque to have an ideal relationship to the calculated engine speed. Frank's methods of controlling the engine involve calculations and lookup tables as to how much torque the motor must force the engine to adopt so that the speed/torque relationship of the engine follows an ideal operating line. Another point Frank describes is how the engine is switched off if its speed is too low as to have non-ideal conditions. Furthermore, Frank's system is described only with reference to vehicles, and does not include other applications of engine-generator sets. Whilst the Frank apparatus controls engine power output via the torque/speed curve reflected from the wheels, with corrections for CVT dynamics terms, a need remains for a system that controls engine power output in a fashion which is independent of wheel loads.

DISCLOSURE OF INVENTION

The present invention comprises a generator driven by, and connected to, a prime mover, typically a heat engine. The generator is connected to a load and to an electronic control system.

The present invention controls fuel consumption, power output and heat engine operation, by electronic control of the torque/speed characteristics of the generator. This electronic control of torque/speed characteristics is obtained either by direct control of generator excitation, or by indirect control of the voltage/current or frequency characteristic of the load. Control of the system by electronic control of the generator allows for heat engine operation in a wide-open throttle condition, while being able to operate over a large speed range. The quantity of fuel consumed per piston stroke is maximized, and the energy output per piston stroke remains essentially constant. The power output of the engine/generator system is regulated by controlling the number of piston strokes per second. In general, feedback does not directly control engine speed, but instead power output.

In a further embodiment of the present invention, a throttle or fuel metering is used to maintain the charge of fuel and air in the cylinder at a predetermined maximum level. For maximum efficiency, a throttle operated near the wide open condition may be used. Such a throttle may also find use as an emergency shutdown device, in the event of an electrical failure. As used in the method of the present invention, such a throttle does not take part in the primary control of engine operation.

A further embodiment of the present invention is to dynamically control the torque/speed characteristics of the generator in synchronism with the cyclic torque changes of the power output of the heat engine. The generator may act as a motor for part of the heat engine cycle, powering the heat engine during power absorbing strokes of the cycle. This facilitates the use of single cylinder engines, and engines without flywheels.

A further embodiment of the present invention is a method for controlling an engine. According to the method of the present invention, an engine is provided in an unthrottled state. The torque load on the engine is actively changed in torque/speed characteristics, to force the unthrottled engine to accelerate, or decelerate, or maintain a steady speed, according to a desired power output. A first embodiment accomplishes this by changing the transmission ratio, in a best mode, with a continuously-variable transmission. In a second embodiment, the system includes a generator with more than three phases as the mechanical load, in which stator windings are connected to inverter outputs with a mesh connection. The torque/speed characteristics are changed either by switching between mesh connections, or by synthesizing extra, temporal harmonics for the electrical waveform, or a combination of the two. Doing this with a mesh connection acts to change the impedance of the machine, which directly translates into changing the torque/speed characteristic of the load. In the second embodiment, the transmission may or may not be needed.

Objects of the present invention are, therefore, to provide new and improved methods and apparatus for prime mover-generator systems and control over them, having one or more of the following capabilities, features, and/or characteristics:

A technical advantage of the present invention is that it provides new and improved methods and apparatus for prime mover generator systems and control over them. A further technical advantages is to provide a heat engine generator system in which the heat engine can be continuously operated over a wide load range without induction restriction, avoiding the need for engine throttling.

Another technical advantage of the present invention is that higher engine efficiency is obtained by avoiding engine operation in a near closed throttle mode. Further, the heat engine does not have to be turned on and off in response to demand, but rather the engine runs steadily. This avoids the fumes and pollution caused when a heat engine starts and prevents the loss of rotational energy that occurs from repeated stopping and starting.

A further technical advantage of the present invention is that it provides a heat engine generator system in which control is applied to the generator to electronically regulate the output of the system. Thus, control over the output of the system may be faster and more exact. Further, the load on the heat engine may be electrically manipulated to maintain a close to optimal run of the engine.

A still further technical advantage of the present invention is that it provides a method by which a generator may be operated periodically as a motor. This allows the heat engine operation, during power absorbing strokes, to be improved by a periodic transfer of power from the generator, acting as motor, back to the engine. Thus, the present invention provides a simple method by which an electrical machine may alternate between generator and motor operation without direct control intervention, and without need to synchronize controller operation to heat engine operation.

Other technical advantages of the present invention are set forth in or will be apparent from drawings and the description of the invention that follows, or may be learned from the practice of the invention.

BRIEF DESCRIPTION OF DRAWINGS

For a more complete explanation of the present invention and the technical advantages thereof, reference is now made to the following description and the accompanying drawings, in which:

FIGS. 1a-1h illustrate various embodiments of the present invention;

FIG. 4 is a torque/speed diagram for an internal combustion engine and a DC generator coupled to a set of resistive loads;

FIG. 5 is a torque/speed diagram for an internal combustion engine and an AC induction generator coupled to a power electronic control;

FIG. 9A is an arrangement of an internal combustion engine and an alternator;

FIG. 12a is a sample program for implementing an exceeding simple control module according to the method of the present invention;

FIG. 12b is a sample program for implementing a slightly more complex control module according to the method of the present invention;

FIG. 17b shows a sample switch for possible use within the subsystem of FIG. 17a;

BEST MODE FOR CARRYING OUT THE INVENTION

A system is described in which an unthrottled engine's output is controlled by the effect of a transmission between the engine and a mechanical load. Embodiments of the present invention and their technical advantages may be better understood by referring to FIGS. 1 though 18, like numerals referring to like and corresponding parts of the various drawings.

Figure 1A:
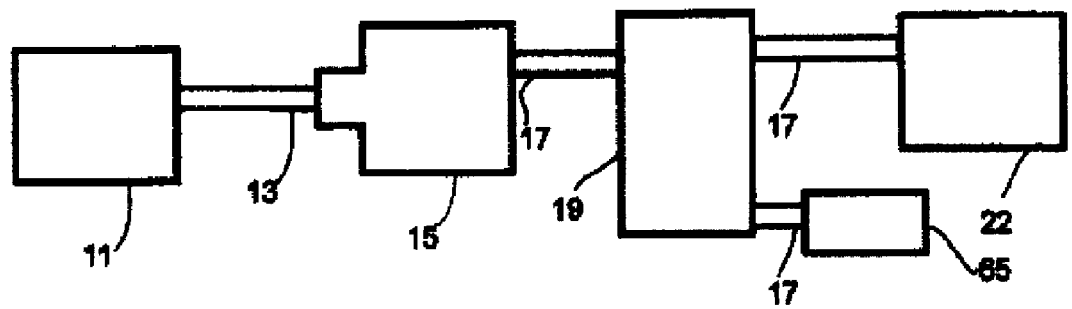

FIG. 1a shows a schematic overview of the present invention. Prime mover 11 is connected to an electric generator 15 via shaft 13. Generator 15 is connected to control mechanism 19, which may take the form of a power electronic load, as described in Example 3, below, via wiring 17. Control mechanism 19 is further electrically connected to an electrical load 22. The control mechanism 19 has an input 65. The generator 15 may be a direct current generator (hereafter, DC), or an alternating current generator (hereafter, AC), as described in the embodiments below, and with reference to the descriptions of various types of generators in the background section above. In the case that the generator 15 is an AC generator, a rectifier 67 may be required between the generator 15 and the control mechanism 19.

Figure 1B:
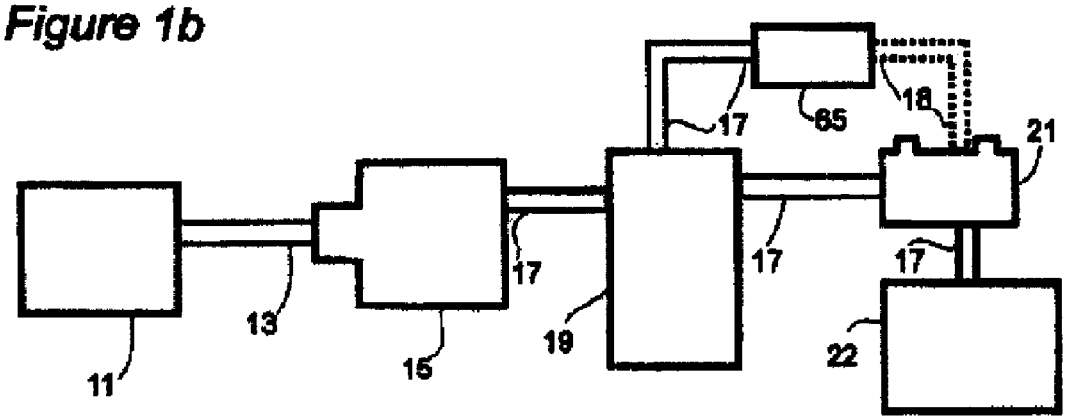

FIG. 1b shows another embodiment of the present invention, comprising a prime mover 11, connected by a shaft 13 to a generator 15. The generator is electrically connected to an energy storage unit 21, and to an electrical load 22. The electrical characteristics of the output of the generator 15 are controlled by control mechanism 19. The control mechanism includes an input 65, which may in some embodiments include signals received from energy storage unit 21, to describe depth, or rate of discharge. Dotted lines 18 represent these signals from said energy storage.

Control mechanism 19 in these figures may contain one or more of several different control features, as described below. It may include variable resistance, or pseudo-resistance, as in a power electronic load, described below. Input 65 in some embodiments may be incorporated into control mechanism 19. To determine the electrical characteristics of the generator 15, required to achieve a required power output, the control mechanism 19 may contain graphical or mathematical techniques. These latter components are well-known in the art, and are not shown specifically on the Figure.

Figure 1C:
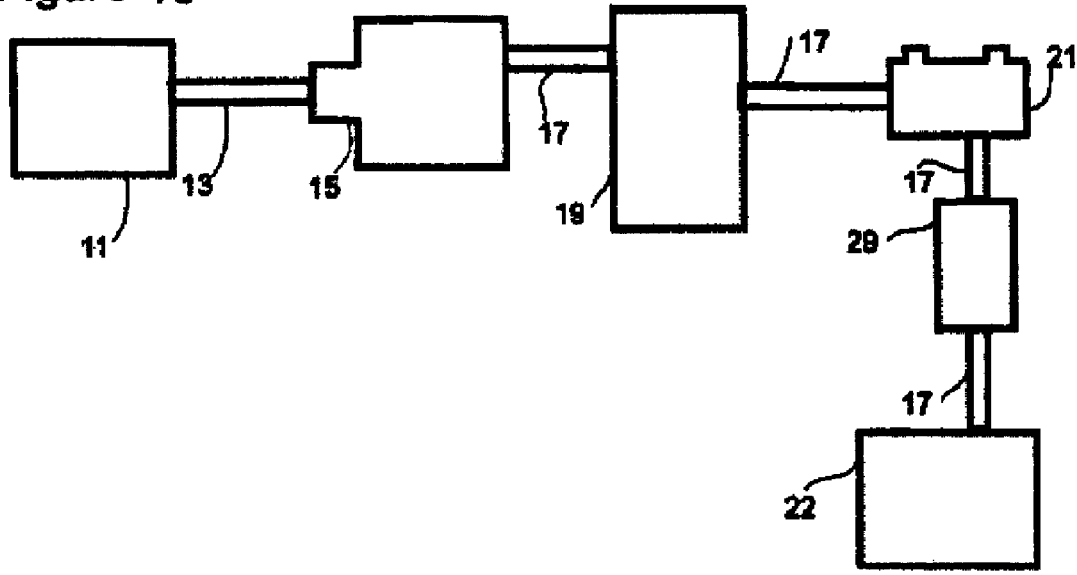

FIG. 1c shows a similar embodiment to FIG. 1b, with the addition of controller 29 electrically connected between the energy storage unit 21 and the electrical load 22. The controller 29 is for supplying power to the electrical load 22 at substantially the electrical requirements of said electrical load 22.

Figure 1D:
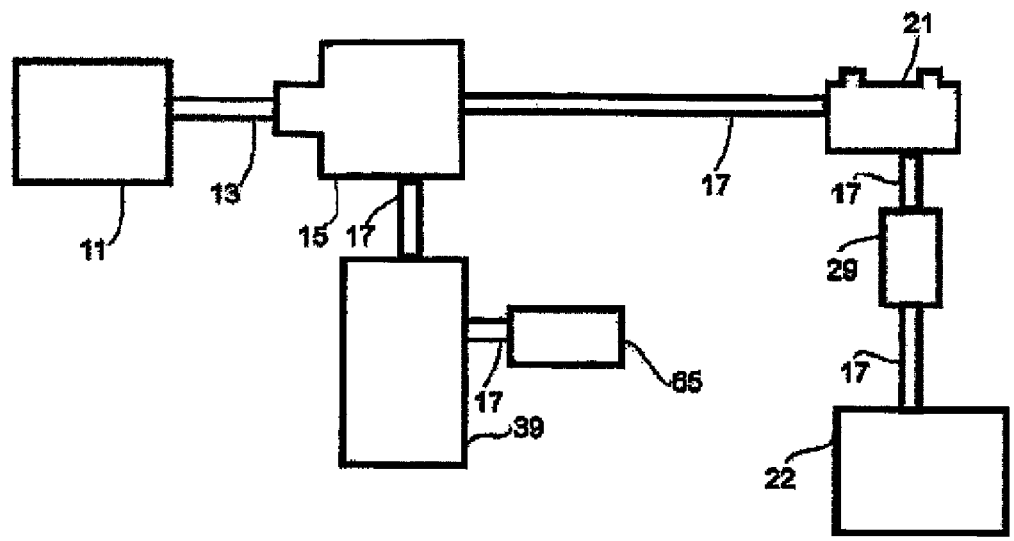

FIG. 1d shows a different embodiment of the present invention. An engine 11 is connected via a shaft to a direct current (DC) generator 15. The excitation of the DC generator is controlled by generator excitation controller 39. The generator is connected with electrical connecting wiring 17 to an energy storage unit 21. The energy storage unit 21 is connected to an electrical load 22, with a controller 29 electrically connected between them load for supplying power to the electrical load 22 at substantially the electrical requirements of the electrical load 22. In related embodiments, the generator is an AC generator with adjustable excitation, in which case a rectifier 67 would need to be added electrically between the generator 15 and the energy storage unit 21.

Figure 1E:
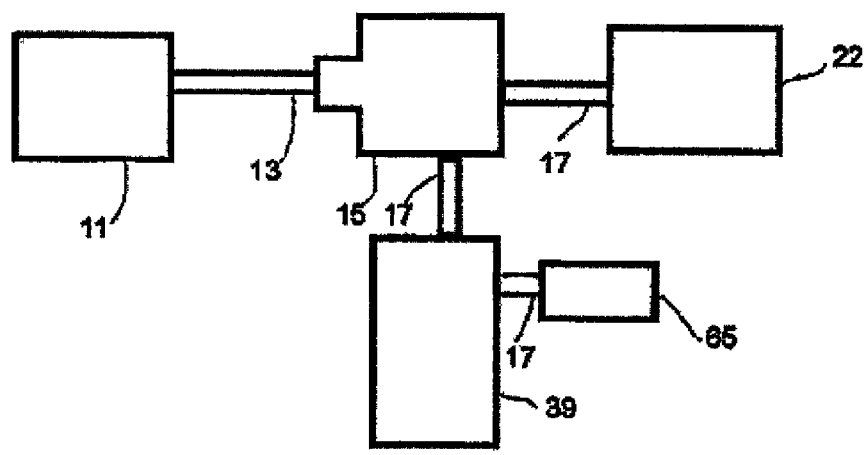

FIG. 1e represents a simpler embodiment, similar to FIG. 1d, in which the energy storage unit 21 is omitted. An engine supplies mechanical power output to a generator, via a shaft 13. The excitation of the generator 15 is controlled by generator excitation controller 39, which adjusts the excitation of the generator 15 to control the torque load that the generator 15 applies to the shaft 13, and thereby control acceleration or deceleration of the engine. The electrical load 22, connected to the electrical output of the generator 15, receives electrical current from the generator 15, at basically required power outputs as determined by the generator excitation controller 39, but also including power fluctuations caused during changes in power output requirements.

Figure 1F:
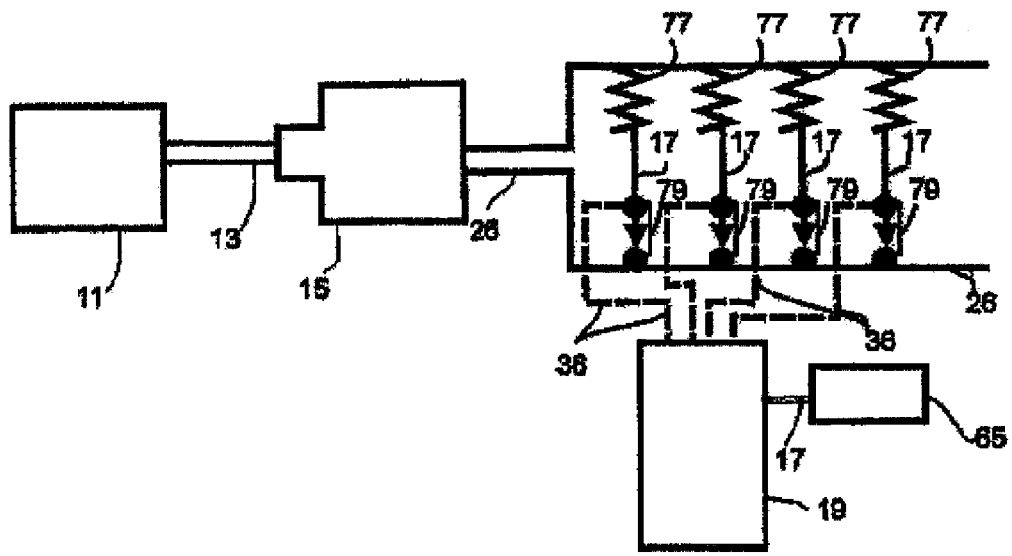

FIG. 1f shows an embodiment of the present invention, in which the load is made of a set of resistive loads. The generator output circuit 26 includes a choice of a few resistive loads 77, connected by switches 79 into the generator output circuit 26. The switches 79 are operated by a control mechanism 19, as seen by the actuator 36.

Figure 1G:
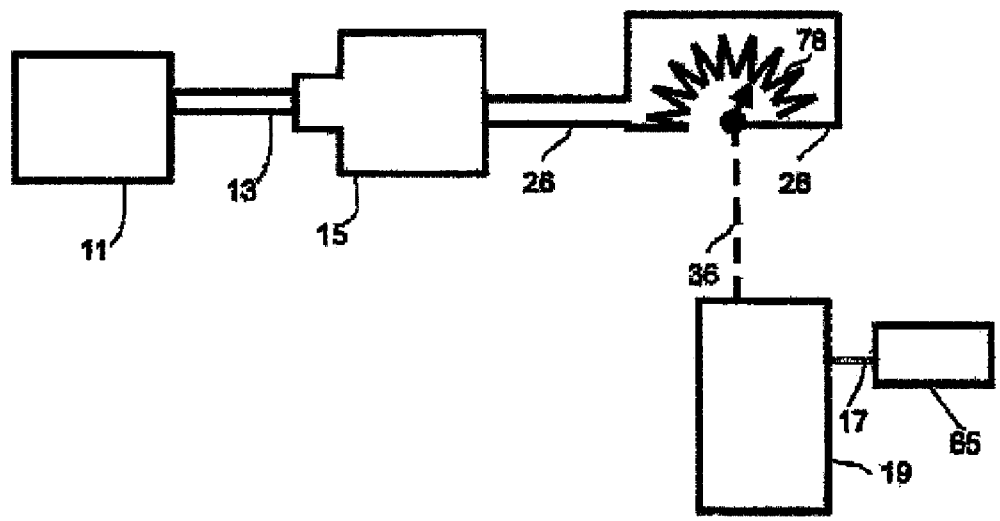

FIG. 1g shows generator output circuit 26 across which a variable resistor 78 has been connected. It is operated by control mechanism 19, as seen by actuator 36. The control mechanism 19 includes an input 65. A further electrical load 22 may also connected to the generator output circuit 26.

FIGS. 1f and 1g are described in detail in the section "Example 1—Changing a Resistive Load on a Generator".

Figure 3:
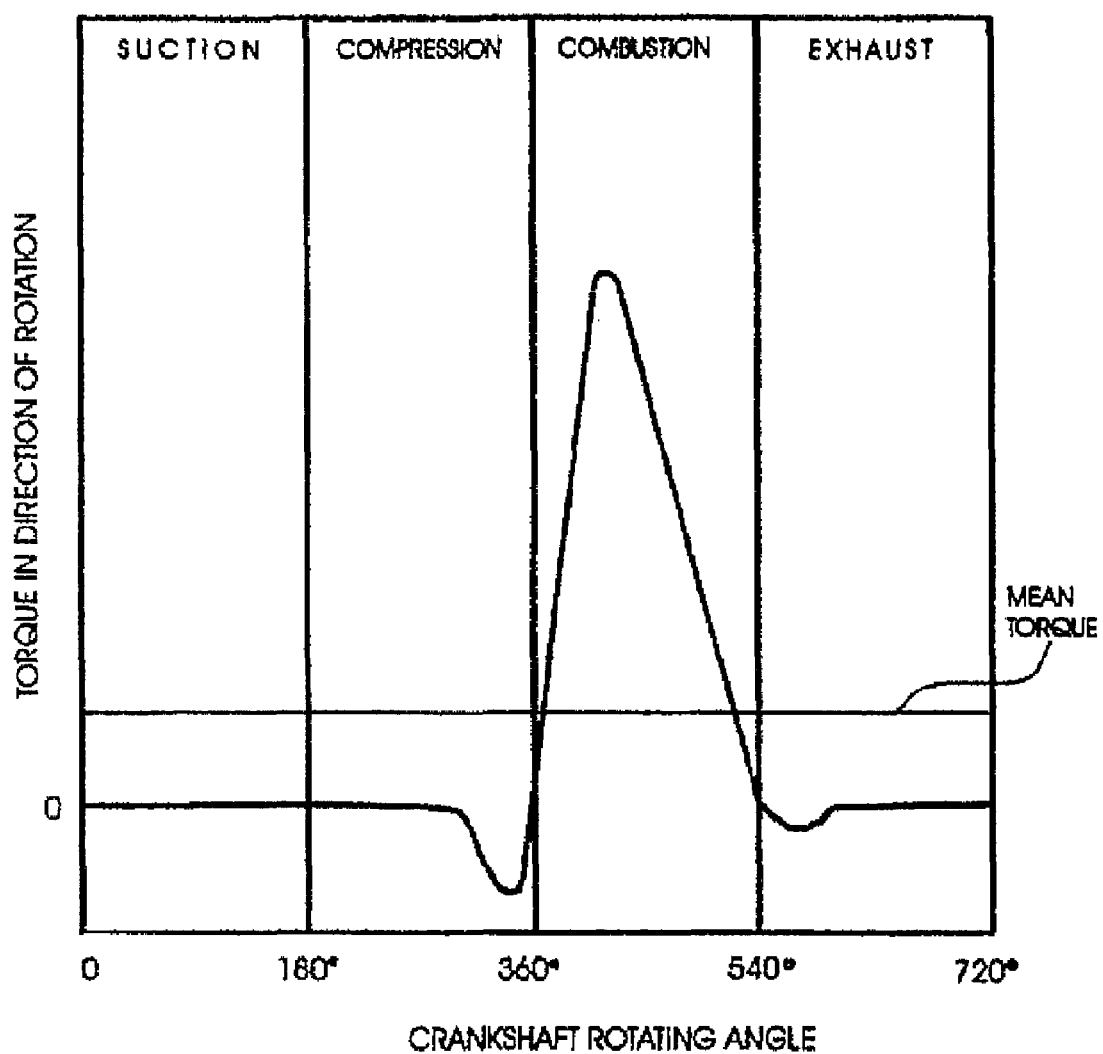
FIG. 3 is a graph of engine and generator torques in one embodiment of the present invention.

FIG. 3 is a graph of the engine and generator torques in one embodiment of the present invention. The engine is a single cylinder diesel engine coupled to an appropriately sized induction generator. The horizontal axis of the graph is time, while the vertical axis of the graph is torque in the direction of rotation. The horizontal axis is divided amongst the four strokes of the engine.

FIG. 4 is a torque/speed diagram for an internal combustion engine and a DC generator coupled to a set of resistive loads. Curve M represents the torque/speed characteristic of this example engine, with the horizontal axis representing rotational velocity, and the vertical axis representing torque in the direction of rotation. Curves G, G', G", G''', . . . , G'''''' represent the torque/speed characteristics of the example DC generator under various load resistance conditions, with the horizontal axis again representing rotational velocity, but with the vertical axis representing torque in the direction counter to rotation.

FIG. 5 is a torque/speed diagram for an internal combustion engine and an AC induction generator coupled to a power electronic control. Curve M represents the torque/speed characteristic of an example engine, with the horizontal axis representing rotational velocity, and the vertical axis representing torque in the direction of rotation. Curves G, G', G", . . . , G'''''' represent the torque/speed characteristics of the example AC generator operating at various drive frequencies and a constant voltage/frequency ratio. The power electronic drive is designed to maintain proper voltage while both sourcing and sinking power.

Figure 6:
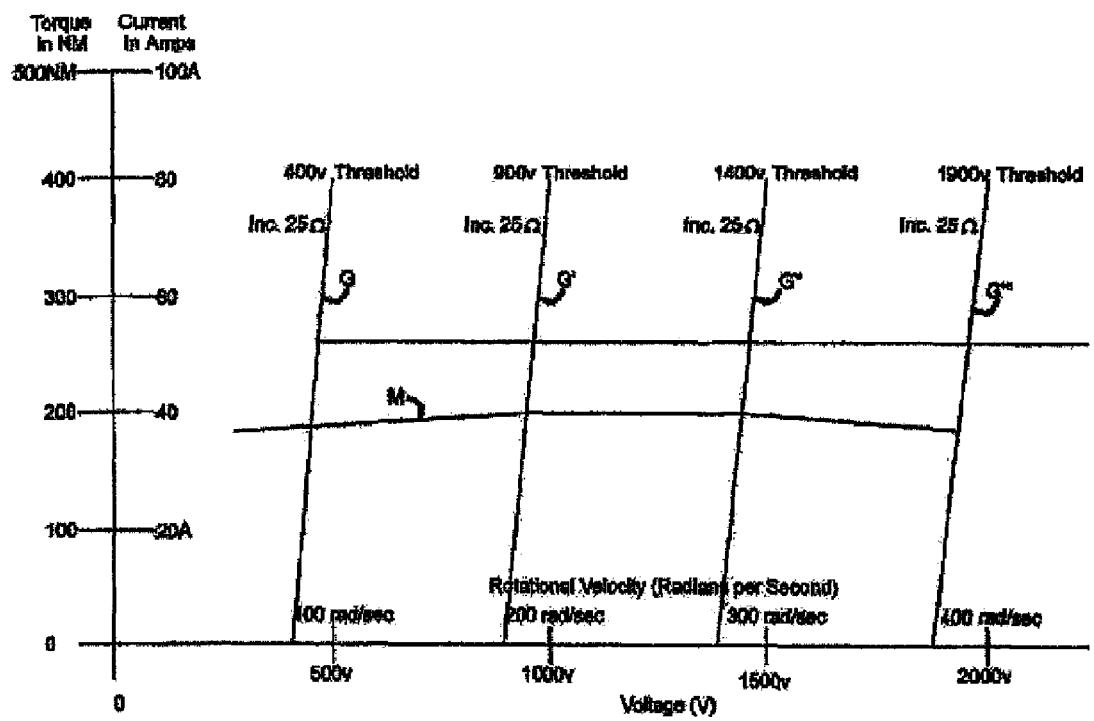
FIG. 6 is a torque/speed diagram for an internal combustion engine and a DC generator coupled to a power electronic load accepting current at various threshold voltages.

FIG. 6 is a torque/speed diagram for an internal combustion engine and a DC generator coupled to a power electronic load accepting current at various threshold voltages. Curve M represents the torque/speed characteristic of an example engine, with the horizontal axis representing rotational velocity, and the vertical axis representing torque in the direction of rotation. Curves G, G', G", G''', . . . , G'''''' represent the torque/speed characteristics of the example DC generator under various load conditions, with the vertical axis representing torque in the direction counter to rotation. The load in this case is designed to have little current flow until a programmed threshold voltage, followed by increasing current flow at an incremental resistance of 2.5 ohms, meaning that for every 10 volts above the threshold voltage, current increases by 4 amps.

Figure 7:
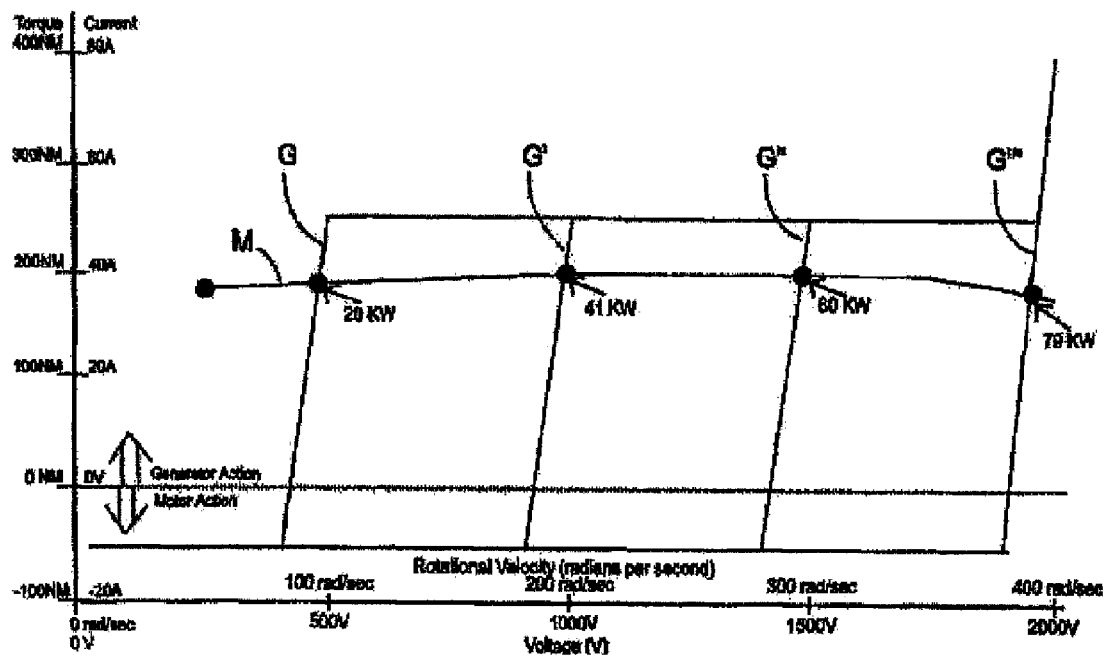
FIG. 7 is a torque/speed diagram for an internal combustion engine and a DC generator coupled to a power electronic load accepting current at various threshold voltages, with sourcing current.

FIG. 7 is a torque/speed diagram for an internal combustion engine and a DC generator coupled to a power electronic load accepting current at various threshold voltages, with the additional capability of sourcing current. Curve M represents the torque/speed characteristic of an example engine, with the horizontal axis representing rotational velocity, and the vertical axis representing torque in the direction of rotation. Curves G, G", G''', . . . , G'''''' represent the torque/speed characteristics of the example DC generator under various load conditions, with the vertical axis representing torque in the direction counter to rotation. The load in this case is designed to source current to the generator until a programmed threshold voltage, followed by increasing current flow at an incremental resistance of 2.5 ohms, meaning that for every 10 volts above the threshold voltage, current consumption increases by 4 amps. The generator will operate as a motor until it reaches a rotational velocity set by the threshold voltage, at which point it will begin to source power to the load.

Figure 8A:
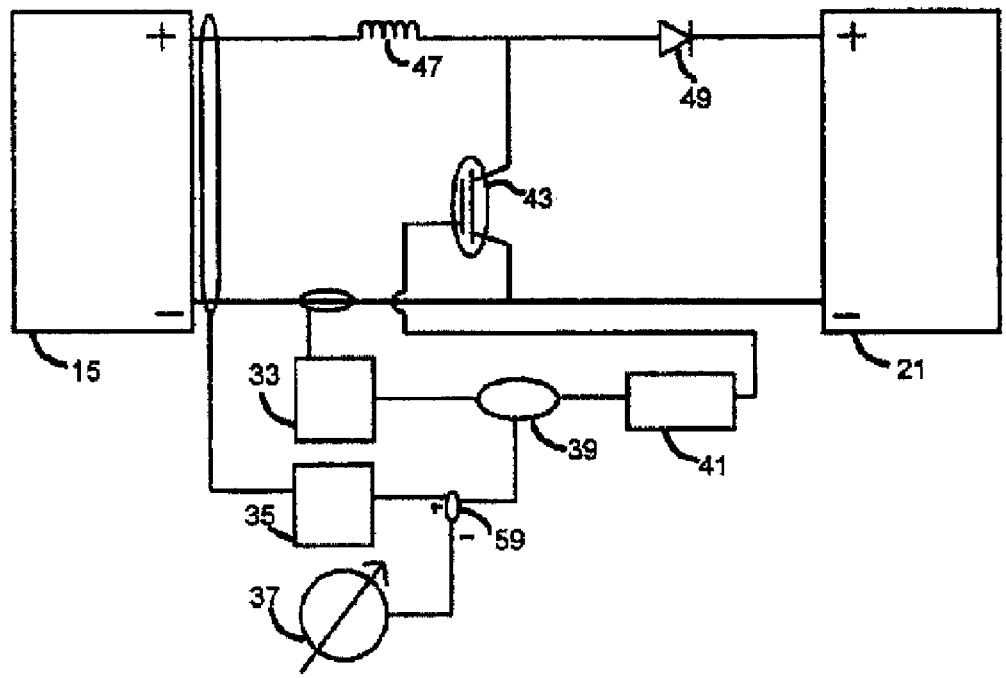
FIG. 8A is a representation of a boost converter with feedback drawn from the input.
Figure 8B:
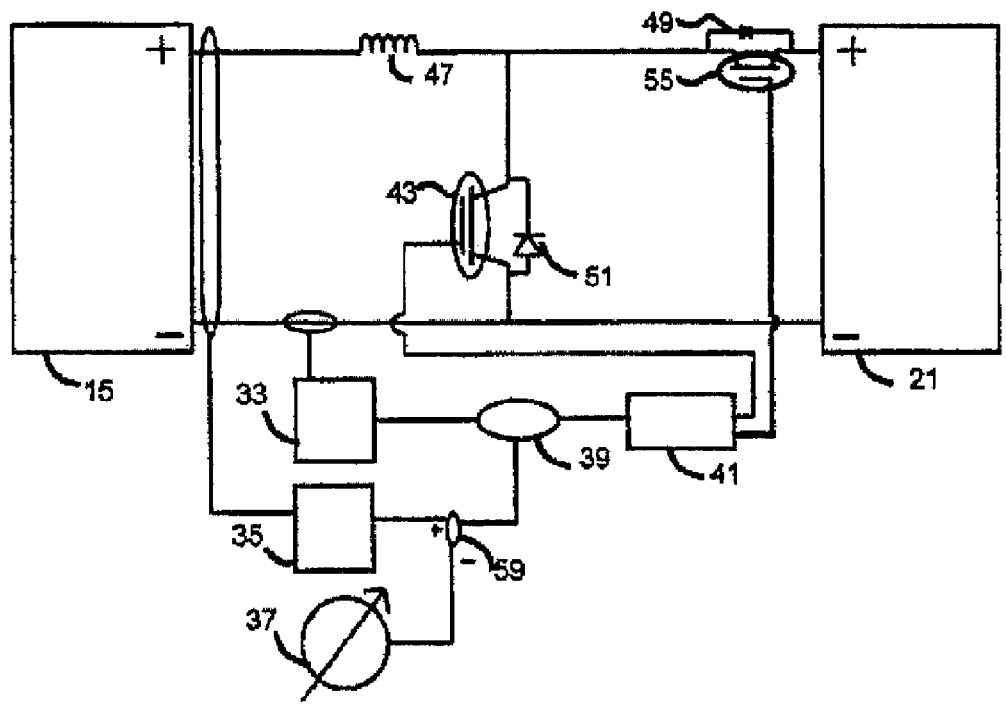
FIG. 8B is a representation of a boost converter load combined with a buck converter power supply.

FIG. 8 are schematic diagrams of power electronic loads. FIG. 8A is a representation of a boost converter with feedback drawn from the input. FIG. 8B is a representation of a boost converter load combined with buck converter power supply to cause the generator to act as a motor at low voltage levels.

Figure 9B:
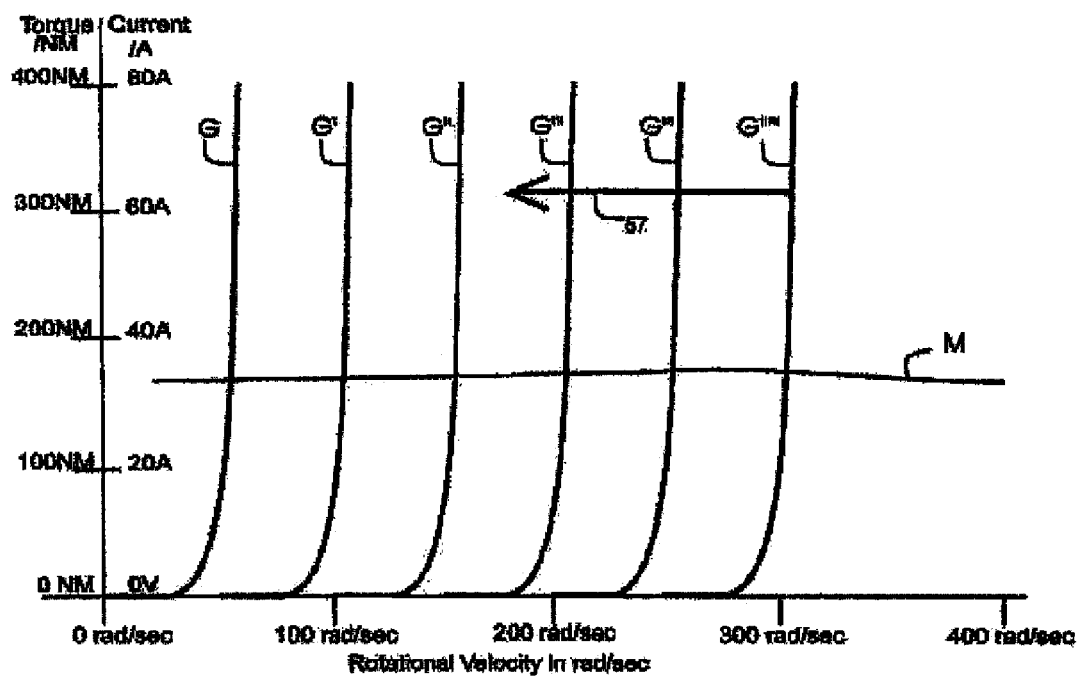
FIG. 9B is a torque/speed diagram for an internal combustion engine and an alternator supplying power to a battery.
Figure 9C:
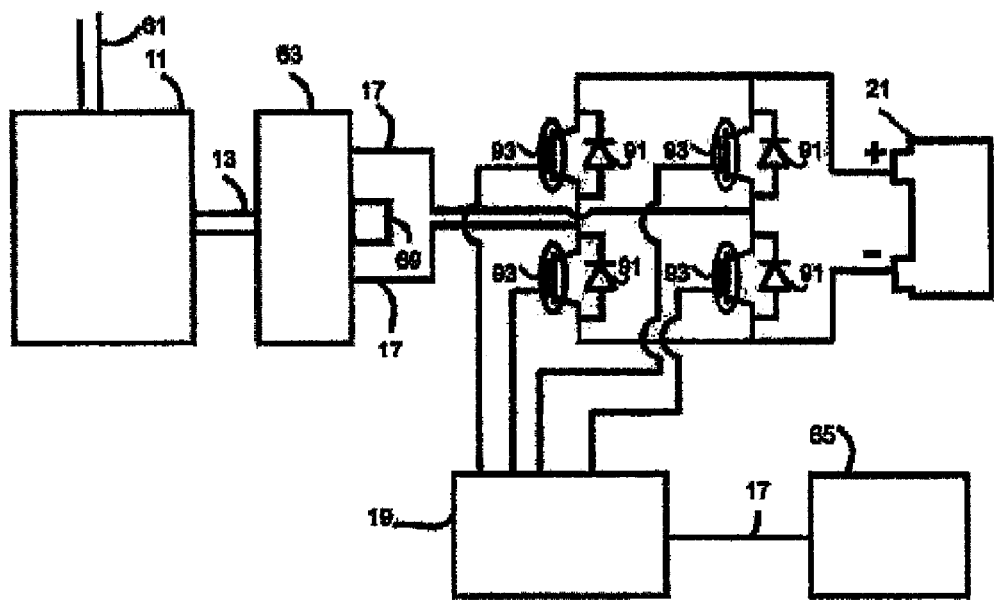
FIG. 9C is an arrangement of an internal combustion engine and an alternator in one embodiment of the method of the present invention.

FIG. 9 are schematic diagrams of the use of an automotive alternator in the method of the present invention. FIG. 9A represents an alternator in its prior art usage. FIG. 9C is the arrangement of the alternator in the method of the present invention. FIG. 9B is a torque/speed diagram for an internal combustion engine and an alternator supplying power to a battery. The alternator has adjustable excitation. Curve M represents the torque/speed characteristic of an example engine, with the horizontal axis representing rotational velocity, and the vertical axis representing torque in the direction of rotation. Curves G, G', G", ..., G"''' represent the torque/speed characteristics of the example alternator under various excitation conditions, with the vertical axis representing torque in the direction counter to rotation. In this case, the load is simply a battery. Current through the alternator rectifier is essentially zero until the alternator voltage matches battery voltage, at which point current and torque begins to rise rapidly. Alternator voltage may be adjusted by adjusting excitation.

In the method of the present invention, the power output of the heat engine/mechanical load system is controlled by electrical manipulation of the torque/speed characteristics of the torque load of the mechanical generator, as it is presented to the prime mover. The present invention comprises a heat engine, a mechanical load, and a controller. Electrical energy storage, in addition to suitable control means for the same, may additionally be used. A load consumes the mechanical power produced. This may be the mechanical load itself, or an electrical load using electricity produced by a generator which acts as the mechanical load. To facilitate understanding, the common diesel engine rotating an induction generator system will be used to describe a particular embodiment of the present invention. The present invention may be used with all common internal combustion engines, including Otto cycle engines, two stroke engines, and rotary engines, as well as with other prime movers whose potential energy consumption may be controlled by the RPM of the prime mover.

The common feature of diesel engines, Otto cycle engines, two stroke engines, and Wankel rotary engines is that air intake and fuel burned are directly controlled by the rotational velocity of the engine. The greater the number of engine cycles per second, the more fuel burned, and the greater the power output. Other devices, for example piston engines operated by steam pressure, share the common feature that rotational velocity determines potential energy consumed and thus, power output.

The heat engine is directly coupled to the generator, via a mechanical means, such as a shaft, or gearing or other speed changing apparatus. Gearing or other speed changing apparatus 82 is shown in FIG. 1h. The generator converts mechanical power into electrical power, and driving an output current through a load. The torque/speed relation of the generator is electronically controlled, either by direct control of generator excitation, or by control of load voltage/current or load frequency characteristics. Through control of the torque/speed characteristics of the generator, control of the system's rotational velocity is effected without the use of a throttle. The heat engine is operated at wide-open throttle, with power variation being achieved through changes in rotational velocity.

To achieve variation in system power output, the speed of the engine is changed to produce the desired power output at wide-open throttle condition. The speed of the generator is the same as, or related to, the speed of the prime mover to which it is connected.

In the method of the present invention, the speed of the system can be indirectly manipulated by altering the relationship between the generator's torque requirements and its speed. The engine/generator equilibrium speed is changed, and the system moves to this new speed. In general, higher engine speed means more fuel consumption and more power output, thus, control of system power output is achieved through the manipulation of generator torque/speed characteristic.

The manipulation of generator torque/speed characteristic can be done, for example, in two ways: a switching or changeable load or by changing the excitation magnitude or frequency of the generator. When using a switching or changeable load, the load can be made to draw more or less current. This will increase or decrease the torque requirements, or "torque load" of the generator.

When changing the excitation magnitude or frequency of the generator, the characteristics of the power supplied to the load is changed. In the case of AC machines, the excitation frequency sets the synchronous speed of the generator. In the case of both AC and DC machines, the excitation current sets the strength of the magnetic field in the generator, and thus, the voltage output at a particular RPM.

An AC induction generator contains stator windings which both provide output as well as excitation. The frequency and voltage of the excitation can be modified to produce a difference in the torque load of the generator. The excitation is provided by quadrature AC, that is alternating current in which the current is not in phase with the voltage. Quadrature AC in the stator windings induces current in the rotor windings, and the current in the rotor windings generates the magnetic field. The induction machine excitation can be controlled through the use of power electronics. They can arbitrarily draw current out of phase with the voltage, and can thereby adjust the quadrature current flowing in an induction machine. The power electronic may comprise an inverter, such as is used to operate induction motors in variable speed applications. The use of the inverter allows for direct control of synchronous speed, and thus, control of the equilibrium point between heat engine torque and generator load. The power electronics can also change the voltage that the system is operating at, which will change the excitation current levels. Power electronics can also control the total current drawn, and in this fashion can also adjust machine torque and power output.

Similarly, for the synchronous generator, synchronous speed is frequency controlled. A synchronous generator works in the following manner. In the synchronous machine, the stator poles are magnetized with a rotating magnetic field. The north stator pole is magnetically attracted to the south rotor pole, and the south stator pole is attracted to the north rotor pole. In generator action the north and south poles of the rotor are slightly ahead of their stator opposites and pull them along. Unlike induction machines, the synchronous machine's rotating magnetic field is rotating at the same velocity as the rotor, which is known as the synchronous speed. However, there is ability for control over the torque load of the generator, in the angular difference between the equivalent poles of the rotor and stator. This angular difference is directly related to the torque load of the generator on the prime mover.

Control of AC synchronous machines may thereby be achieved through the control of the frequency and voltage applied to the terminals of the machine. The applied frequency can differ only slightly from the actual rotational velocity of the rotor, or the machine will fall out of synchronism. Slight changes in drive frequency will cause the rotor to speed up or slow down in order to return to synchronism. The rotor poles would then, after that brief moment of change, although being in synchronism with the stator poles, be slightly more ahead of, or slightly closer to, their stator equivalents. In this state the generator would be applying a different torque load on the prime mover. Making controlled changes in drive frequency and/or drive voltage may be used in the method of the present invention to actively control the torque load, and thereby the speed and total power output of the prime mover.

The output of the synchronous generator may also be converted, using suitable apparatus, for example an AC input switching power supply may be used to increase the current drawn by the load, again increasing power output and torque load upon the prime mover.

In the case of the DC generator, generator torque load is nearly linear in output current level. Thus, one may dynamically adjust the torque load by changing load resistance, for example, through the use of a DC-DC converter. Generator torque load is also nearly linear with field excitation, thus, generator torque load may be controlled by adjustment of the field, if a suitable load is being supplied.

An AC synchronous generator with a wound rotor, driving a DC load through suitable rectification means, will operate similarly to a DC generator, as described above, and with similar control capabilities.

As stated above, the speed of the engine/generator system is set by torque equilibrium. If, when the system is in equilibrium at a particular speed with a particular torque equilibrium, the torque/speed characteristic of the generator is changed, then for that particular speed the generator will now have a different torque. The torques of the system will no longer be in equilibrium and the speed of the engine will usually change. When the speed of the engine changes, the speed of the generator changes too. The engine/generator system will speed up or slow down depending upon the net total torque between engine and generator.

In the case of a heat engine coupled to an induction generator supplying a constant voltage load, a slight reduction in the excitation frequency will lower system synchronous speed. As the generator's slip has now increased, its torque load will be greater. This will cause the system to slow down. An increase in synchronous speed will decrease the torque load of the generator, and cause the system to speed up. Note that the power electronic controller may be required to source or sink additional drive power during these speed changes, and that the extent of the speed changes will be limited by the maxima of the torque speed characteristics of the generator. If drive frequency is changed such that the generator is operating well above synchronous speed, then the torque maximum may be passed and torque may be reduced.

In the case of a heat engine coupled to a DC generator, a slight reduction in the excitation current will decrease the voltage output of the generator. Presuming a resistive load, this will reduce the current being driven through the load. The torque requirements of the generator are thereby reduced and the equilibrium speed will be at a higher level. The engine/generator system will speed up. An increase in field excitation will increase the voltage and current, and hence the torque load of the generator and cause the system to slow down. The excitation field is often produced by an electromagnet, allowing the field excitation to be electronically controlled.

The power output changes need not preceded by a closing or opening of a throttle. The imbalance between the torque output of the engine and the torque load of the generator, caused by changes in the electrical characteristics of the generator, changes the speed of the engine. It is the change in engine speed that causes the fuel draw of the engine to change.

It should be noted that a change in power requirements does not mean that the power requirement is immediately met by the power output of the generator. In order to reduce the power output of the system, the system speed is reduced. But in order to reduce system speed, the torque load of the generator is increased, in order to cause the RPM change. Power is given by the product of torque and rotational velocity. Thus, the torque has increased, but rotational velocity has not had time to change. To slow the system down in response to a reduction in load, for a moment the power output is increased. Likewise, in response to a required increase in load, for a moment the power output is decreased. Changes are arranged by altering the net torque of the system with the goal of modifying the RPM of the engine, and thereby changing the power output of the system.

The above torque equilibrium may be supplemented and further clarified by consideration of power equilibrium.

In order to maintain and control the speed and power output of the engine while keeping its throttle at the wide-open state, the following control procedure may be used:

(1) If the engine is rotating too fast and therefore consuming too much fuel and producing too much power, then more torque is absorbed by the generator and the load, slowing down the engine, or (2) if the engine is rotating too slowly, then less torque is absorbed by the generator and the load, causing the engine to speed up.

This control procedure may be understood in terms of the torque balance description presented above. Rotational power is given by the product of torque and rotational velocity. As the engine and generator are locked together in terms of rotational velocity, the only variable is the torque. If the engine torque is greater than the torque being absorbed by the generator, then the engine power will be greater than the power being absorbed by the generator, and the system will speed up. If the engine torque is less than the torque being absorbed by the generator, then the engine power will be less than the power being absorbed by the generator, and the system will slow down.

A throttle not being intrinsic to the present invention, it nevertheless may play a role in such systems. For example, it may be used for emergency overall control, for shutdown, or for very speedy changes, with the method of the present invention used afterwards to achieve a more efficient engine performance, or a throttle may be used to put limits on the amount of fuel the engine may speed up to, for example, when the control over the current being automatic and subject to error or overload.

According to another aspect of the present invention, one component part of the torque load is deliberately changed in torque/speed characteristics, to force the unthrottled engine to accelerate, or decelerate, or maintain a steady speed, according to a desired power output. A first embodiment accomplishes this by changing the transmission ratio. In a second embodiment, the system includes a generator with more than three phases as the mechanical load, in which stator windings are connected to inverter outputs with a mesh connection. The torque/speed characteristics are changed either by switching between mesh connections, or by synthesizing extra, temporal harmonics for the electrical waveform, or a combination of the two. Doing this with a mesh connection acts to change the impedance of the machine, which directly translates into changing the torque/speed characteristic of the load. In the second embodiment, the transmission may or may not be needed.

In the method of the present invention, the speed of the system can be indirectly manipulated by altering the relationship between the torque load on the engine, and the speed. The engine/mechanical load equilibrium speed is changed, and the system moves to this new speed. In general, higher engine speed means more fuel consumption and more power output, thus, control of system power output is achieved through the manipulation of the mechanical load (including the transmission) torque/speed characteristic.

EXAMPLES

As described above, there are numerous generators which may be considered for the present invention, each with several torque control strategies, and all supplying electrical power to a load which itself may be subject to one of several control strategies. Below are specific examples of the present invention, using a few of the many possible combinations of generator, control technique, and load. The following examples are intended to be purely exemplary, and should not be construed to limit the present invention in any fashion.

Example 1

Changing a Resistive Load on a Generator

For example, the present invention may be used with a DC generator supplying a resistive load. Similar results will be obtained from a synchronous AC generator supplying a resistive load with no frequency regulation, or to an AC induction generator with passive supply of excitation, (e.g. a capacitive excitation supply). The immediate example will not work with an AC machine operating on a fixed frequency load.

An engine produces a mechanical power output. This mechanical power is converted by a generator into electrical power. The electrical power is fed to a resistive load where it is dissipated. Due to external control input, decreased power supply is needed (for example, a thermostat has signaled a state of sufficient heat). To reduce the engine power output, the fuel being consumed by the engine is reduced, which is done by slowing the engine down.

To slow the engine down, the torque load of the generator is increased. This may be accomplished by an increase in the power output of the generator.

The generator torque load may be increased by increasing the output current supplied to the load. This may be accomplished by a decrease in the resistance of the load on the generator. More current flows through the lower resistance, and causes the torque load of the generator to be immediately increased. The torque of the system is no longer in equilibrium, the torque of the engine being lower than the torque load of the generator. The speed of the engine decreases, and with it, the engine torque changes according to its torque speed characteristics. When the required engine power output, determined by the product of engine torque and speed, is reached, the load resistance is increased to reduce the generator torque load and restore engine/generator torque equilibrium. Since there is again equilibrium between torque and torque load, the system stops decelerating. At this point the engine is running at a lower speed and with an appropriate torque to maintain that speed and the generator's decreased power requirement is being met. A slightly different method is to decrease the load resistance, and to let the engine/generator system come to equilibrium with the new load resistance. As the engine/generator system slows down, the generator voltage automatically decreases, thus, decreasing the current flow through the resistive load. As the generator torque comes into equilibrium with the engine torque, the system speed will cease to change.

When an increased power supply is desired, the opposite is done. The torque load of the generator is decreased. The load resistance of a resistive load on the generator is increased. This causes the torque load of the generator and the torque of the engine to cease to be in equilibrium, and in this case the speed will increase. When the required engine power output is reached, an increased torque load is applied, equal to the torque output of the engine. The system ceases to accelerate since there is torque equilibrium.

Again, a single step process is possible in which the resistance of the electrical load is simply increased, and the engine/generator allowed to come to equilibrium with the new load.

With reference to FIG. 4, a graph of torque versus speed for both an internal combustion engine and for a DC generator with various resistive loads is shown. To simplify the example, the effects of armature reaction are ignored. Armature reaction is the factor that reduces the voltage output of a generator as its output current increases. Thus, the actual output of the generator will be somewhat different from the values calculated herein, in that the torque/speed curves for the generator will curve toward horizontal as torque increases, until a maximum current and torque is attained. However the general nature of the output changes will provide a valid example of the method of the present invention. Generator efficiency is also ignored.

The abscissa of the graph of FIG. 4 represents speed in radians per second, while the ordinate of the graph represents torque in newton meters. Curve M represents the torque of the engine, with positive ordinate values representing power output of the engine, that is torque in the direction of rotation. Curves G, G', G", G"', etc. represent the torque of the generator with various resistive loads, with positive ordinate values representing power consumption of the generator, that is torque in the direction opposite that of rotation. Curves G, G, G, G, etc. are labeled with the resistances placed on the generator for each curve. A circuit diagram for connecting the output of the generator to these various resistive loads is depicted by FIG. 1f. Each of resistive loads 77 represents a different resistance. They may be connected individually or in combination. A circuit diagram for connecting the output of the generator to a variable resistor is depicted by FIG. 1g. The resistive loads 77 or the variable resistor 78 could take the form of resistance heaters. A state of equilibrium is achieved when the total torque on the shaft between engine and generator is zero, that is, when engine torque output is equal to generator torque input. This is represented graphically by the intersection of an engine torque/speed curve and a generator-load torque/speed curve.

The example generator produces 2000 V output at 400 radians per second, with a maximum continuous current rating of 50 A, and a maximum rotational velocity of 500 radians per second. The example internal combustion engine has a slightly curved torque characteristic, ranging from 180 newton meters at its minimum speed of 50 radians per second, to a peak of 200 newton meters at 200 radians per second, decaying to 175 newton meters at its maximum rotational velocity of 400 radians per second.

For example, consider operation of the above system with a 25 ohm load. To describe the 25 ohm load line, two points of the line are calculated. The first point is the torque at zero speed. At a rotational velocity of 0 radians per second, the generator voltage will be 0, and thus, the current flowing through the load will be 0. Generator torque will therefore be 0. At a rotational velocity of 400 radians per second, the generator voltage will be 2000 V, and the current flowing through the load will be 80 amperes, an overload condition. The power output of the generator is 2000 V times, 80 A, or 160 kW. To provide 160 kW at 400 radians per second, the generator torque must be 400 newton meters. The intersection of this load line with the engine torque curve is at 200 radians per second and 200 newton meters. At a rotational velocity of 200 radians per second, the engine is providing a torque of 200 newton meters, or a power of 40 kW. The generator is locked to the engine at 200 radians per second, and with this particular resistive load is providing a torque load of 200 newton meters. Thus, the engine and generator are in torque equilibrium, and system power output is 40 kW.

When there is a change of operation to a 20 ohm load, the 20 ohm load line also passes through zero torque at zero speed. At 400 radians per second, the generator voltage is 2000 V, and the current through the load is 100 amperes, with a power output of 200 kW, and a generator torque of 500 newton meters. At 200 radians per second, the equilibrium point for a 25 ohm load, the generator voltage is 1000 V, the current through the load is 50 amperes, and the generator torque is 250 newton meters, considerably more than the torque output of the engine at 200 radians per second. The intersection of the 20 ohm load line and the engine torque curve may be determined graphically to be at about 158 radians per second, with a torque of 198 newton meters. The generator output voltage is 790 volts, and the current through the load is 39.5 amperes, for a power output of 31.2 kW. By decreasing the load resistance equilibrium operating point is changed and the power output of the engine/generator system is reduced, without the use of a throttle.

At the point that the load resistance is changed to 20 ohm resistance, with the system is at equilibrium with a 25 ohm load, with a power output of 40 kW and a rotational velocity of 200 radians per, at that instant, the generator is still rotating at 200 radians per second, and sourcing 1000 volts. 50 amperes will flow to the load, and at the instant of the change over, 50 kW is being supplied to the load, an increase in power output. However the engine/generator system is not in equilibrium, and will slow down, eventually reaching the desired lower power output level.

The load resistance may also be changed in a continual fashion, to reduce the surge of output power that occurs with a sudden load resistance change. Going to the opposite extreme, the load resistance may be changed beyond that required by the new equilibrium, to be restored to the equilibrium resistance when the appropriate value when the calculated system speed is reached. This will increase both power surges or deficits, and further increase the rate at which system speed changes.

Graphical or mathematical techniques may be used to determine equilibrium power output of an engine/generator system given a particular resistive load.

Example 2

Changing the Excitation Frequency

Another way to change the torque load of a generator involves changing the excitation frequency of the generator, as described above. This changes the synchronous speed, and the difference in initial speed relative to the synchronous speed causes a generator torque change. This causes a changed electrical power output, a changed torque load, and acts to change the engine/generator speed. While these changes are taking place, the load on the generator will see a constantly changing power supply. If this is inappropriate, then excess power supplied will have to be diverted to a secondary load, and a reduced power supply will have to be supplemented from a separate power source. Change in synchronous speed is a technique applicable to AC generators, such as induction or synchronous machines.

In general, to slow down the heat engine, the excitation frequency will be decreased, and to speed up the heat engine, the excitation frequency will be increased. In the case of an AC induction generator operating in its normal operating range, torque changes in an essentially linear fashion about synchronous speed, with zero torque right at synchronous speed, a positive torque load for rotor speeds above synchronous speed, and negative torque loads (motoring operation) below synchronous speed. Real power output will change along with such changes in generator torque, and the electrical load on the generator is compatible with such power output changes, e.g., a resistive load as described above works during generator operation, whereas some sort of battery would be necessary for motoring operations.

It is possible to adjust the synchronous speed to achieve the desired change in a single step. However, large changes in synchronous speed could result in non-desired results. The torque/speed curves have maxima, and the trending in both directions towards equilibria only happens if the torque load is below the generator side maximum. Beyond that point, if the generator torque load is greater than the engine torque, the system may slow down towards equilibrium, but should the generator torque load be lower than the engine torque, then the system will accelerate and continue to do so. Therefore, when the system is to be sped up by a large amount, it may be necessary to change the generator torque load in stages, to produce a slower and more gradual change.

For example, a slow change may be appropriate if there were no energy storage, a slight lowering in power was desired, and the amount of time needed to reach the new power level was not a factor.

A fast change may be appropriate if there was an energy storage or supply, and the amount of time need to reach to the new power level was a factor.

With reference to FIG. 5, a graph of torque versus speed for both an internal combustion engine and for an AC induction generator connected to an excitation source operating at various frequencies is disclosed. The abscissa of the graph represents speed in radians per second, while the ordinate of the graph represents torque in newton meters. Curve M represents the torque of the engine, with positive ordinate values representing power output of the engine, that is torque in the direction of rotation. Curves G, G', G", G''', etc. represent the torque of the generator with various excitation frequencies, with positive ordinate values representing power consumption of the generator, that is torque in the direction opposite that of rotation. Curves G, G', G", G''', etc. are labeled with the excitation placed on the generator for each curve. In this particular instance, the excitation voltage is proportional to the excitation frequency, meaning that excitation remains constant. The power electronic drive/load must source or sink current as appropriate to maintain proper operating voltage. Note should also be made of the fact that on each curve, below the excitation frequency, the generator is operating as a motor. It is also useful to note that the generator will act as a motor, and produce torque, at zero speed.

Figure 2A:
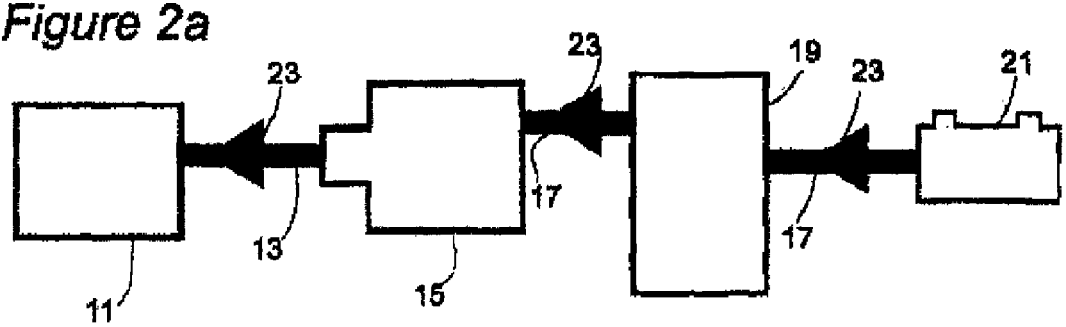
FIGS. 2a-2d illustrate the direction of power flows during operation of one embodiment of the present invention.
Figure 2B:
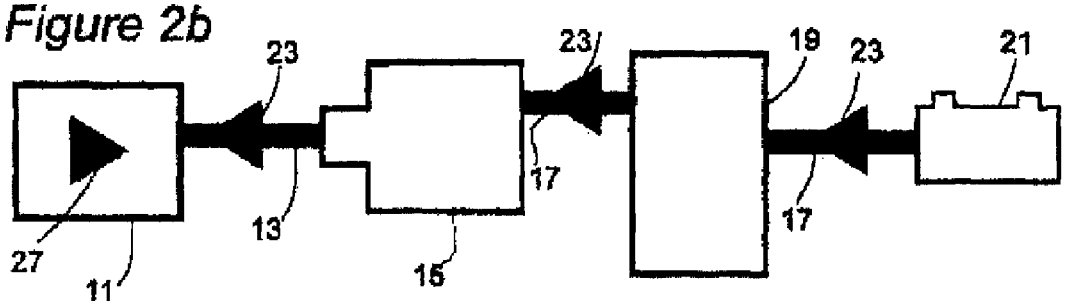
Figure 2C:
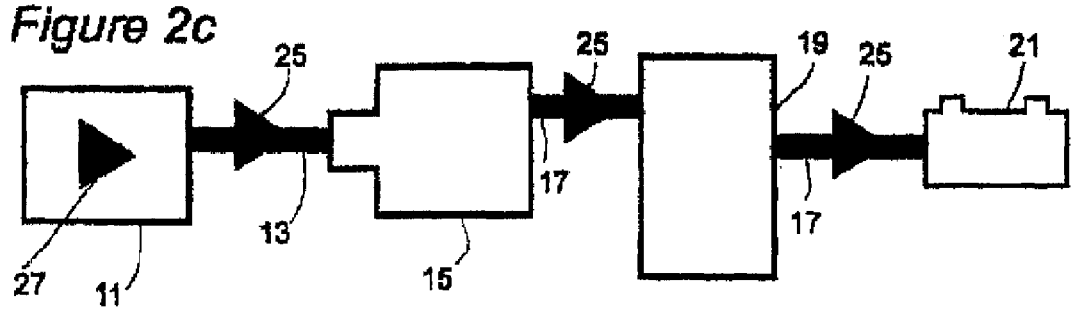
Figure 2D:
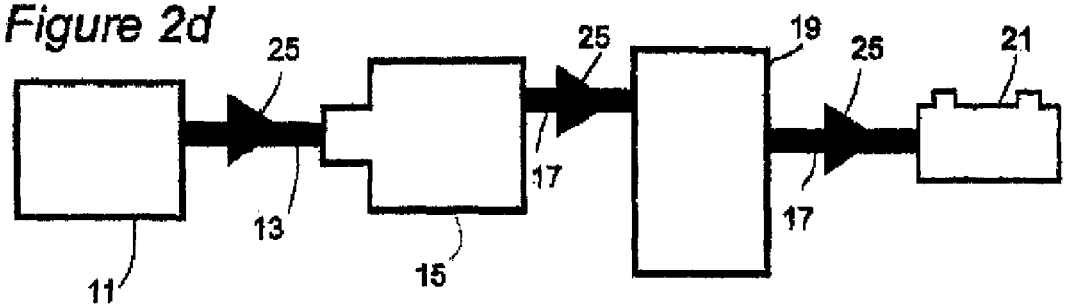

For example, consider an initial condition of the engine and generator not operating. FIGS. 2a-2d is referenced in this section. All of FIGS. 2a-2d show an engine 11 joined by a crank shaft 13 to a generator 15. A control mechanism 19—in this embodiment, taking the form of a power electronic load 19, and preferably an inverter, controls the electrical characteristics of the current between the generator 19 and an energy storage unit 21. The energy storage unit 21 would normally be connected to an end receiver of the generated electrical power; this end receiver is not shown. Power flows are shown by the bold arrows. The bold arrows 23, 25 and 27 point away from the source of current or torque, and towards the recipient. FIG. 2a shows the invention in starting mode. Glow plugs or other startup heat sources may be used in the engine. The power electronic control begins to synthesize alternating current at 100 radians per second (approximately 16 Hz), at suitable voltage for the generator in question. The power electronic control will source considerable current in order to maintain proper operating voltage. The generator will act as a motor, and cause the engine/generator system to start rotation. This may be seen in FIG. 2a. Bold arrows 23 show current being sourced from the energy storage unit 21 by the power electronic load 19, and transmitted to the generator 15, which applies a motoring torque to the crankshaft 13. The engine will consume fuel and air, and start producing power. This may be seen in FIG. 2b, which has the additional arrow 27, representing the torque output of the engine 11 also acting to accelerate the crankshaft 13. The combination of the torque provided by the engine and that provided by the generator will cause the engine/generator system to swiftly accelerate past synchronous speed. At this point, the generator will begin to convert mechanical power into electrical power, and placing a torque load on the system. This may be seen in FIG. 2c, in which bold arrows 25 replace bold arrows 23, showing that the torque of the crankshaft 13 is used by the generator 15, to provide a current to supply to the energy storage unit 21. However, bold arrow 27 remains, to show that the engine 11 is also still providing a torque to the crankshaft 13 to accelerate the crankshaft 13. At a system speed of about 108 radians per second, the generator torque will balance the engine torque, and the system will cease to accelerate. This is shown in FIG. 2d. Bold arrow 27 has disappeared, indicating that the engine is no longer providing an accelerating torque, and bold arrows 25 indicate that the engine 11 provides the torque to the crankshaft 13 which powers the generator 15 to generate electrical current for the energy storage unit 21. Power output will be about 21 kW.

The power electronic control 19 synthesizes alternating current at 200 radians per second, again as suitable voltage. The generator 15 is now operating on a new torque/speed curve, and at the current system speed of 100 radians per second will operate as a motor. This is analogous to FIG. 2b. The combination of engine 11 and generator 15 torques act to accelerate the system to approximately 208 radians per second. At this point, equilibrium will obtain with a power output of about 42 kW. During the initial acceleration phase, the system is actually absorbing power as may be seen by the direction of bold arrows 23, which must be supplied by energy storage 21 connected to the power electronic control 19.

For power output reduction, the drive frequency and synthesis speed is to be reduced. The reduction of drive frequency is limited by the maximum torque range of the generator. If the synchronous speed is reduced so much that generator torque is less than the torque output of the engine, then the system will start to accelerate and enter a runaway condition. A runaway condition occurs when the torque output is greater than the maximum torque load of the generator system, such that the speed will continue to increase until the internal friction of the heat engine prevents further speed increase, or until the system fails.

As mentioned above, small changes in synchronous speed may be used to cause slow changes in power output with only small surplus or deficit power output levels. In situations where such surplus or deficit power is not a problem, extremely rapid changes in power output may be effected. As described above, the example system is simply capable of starting the heat engine.

Specific values of torque, rotational velocity, torque versus slip, and slip are specific to the example engine and generator described above. Different implementations of heat engine connected to induction machine will operate at different torques, slips, and rotational velocities.

Another way to change the generator synchronous speed is to vary the number of magnetic poles developed in the generator. On way to do this is by taking advantage of the pole changing capabilities of motors and generators having high phase counts, such as a 30 phase generator.

Example 3

Power Electronic Pseudo-Resistive Load

A variable resistive load may be used to control the torque/speed characteristics of a generator, thereby obtaining control of engine/generator speed, engine mechanical power output, and thus, engine/generator electrical power output. Such a load need not be an actual resistor, but may be any load with a generally resistive character. Of specific interest are loads which have positive incremental resistance; loads for which current will increase when voltage increases, even if the ratio of current to voltage is not constant as it would be in a true resistor.

As noted above, there is generally an increase in output voltage as the generator speeds up. The value of positive incremental resistance is that as the voltage increases, the current drawn by the load will increase, increasing the torque load of the generator. A generator providing power to a load with positive incremental resistance will be stable to perturbations in prime mover speed, because an increase in prime mover speed will cause an increase in generator torque, acting to slow the system down, while a decrease in prime mover speed will cause a decrease in generator torque, acting to return system speed to the equilibrium value.

As mentioned above, switching power supplies may operate as constant power loads, which have negative incremental resistance, and can cause inherently unstable operation of an engine/generator system. However, switching power supplies may also act as resistive loads, and may be designed so as to act as pure resistors, or to simply have positive incremental resistance over part or all of their operational range. Of particular interest are switching power supplies that draw little or no current until a particular threshold voltage is reached, at which point they steeply increase their current draw as voltage is increased.

Referring to FIG. 4, the intersections of the high resistance load lines with the engine load line get increasingly shallower as power output increases. This means that the natural stability mentioned above will be reduced. Further, the rate at which engine speed changes in response to commanded change becomes less as power output increases. This situation may be enhanced through the use of pseudo-resistive loads.

With reference to FIG. 6, a power electronic load is designed so as to operate with positive incremental resistance. This load draws little or no current until a programmable threshold voltage, at which point current increases at a rate of 0.4 amp per 1 volt change, or an incremental resistance of 2.5 ohms. The power electronic load is further designed to not draw more than 50 amps, thus, preventing generator overload. Generator voltage is directly related to rotational speed, while generator torque is directly related to current draw, in this example using the same sample generator as Example 1. Thus, each electrical load line, selected by selecting controller threshold voltage, may be assigned to a generator torque/speed curve.

With most resistive loads, system rotational speed, and thus, power output, is controlled by the equilibrium between generator torque/speed characteristic and engine torque/speed characteristic. Also, as most loads, the generator torque/speed characteristic is set by the electrical voltage/current characteristic of the load. The improvement is that power electronic load provides for a rapid change of torque versus speed about the desired equilibrium rotational velocity, thus, improving operational stability at the desired power output. Further, the current draw of a power electronic load may be limited to a maximum design to not overload the generator. The incremental resistance of a power electronic load is an aspect of its design, and may be tuned to a particular engine, generator, or load.

A power electronic pseudo resistive load may be used with a DC generator, with a synchronous generator, or with an induction generator, if excitation frequency is not fixed, for example with capacitor excitation. The embodiment may be understood with reference to FIG. 1b. Prime mover 11, which may be a heat engine, is connected via a shaft 13 to generator 15. Control mechanism 19 is connected to the output of generator 15. The control mechanism 19 in the present embodiment takes the form of a power electronic load, also referred to as a power electronic converter.

A power electronic load is quite similar to a power electronic power supply; the essential difference is in the feedback loop. In a power supply, the output is sampled, and errors in the output are corrected through suitable adjustment of the active control elements. In a power electronic load, the input is sampled, and errors in the input are corrected through suitable adjustment of the control elements. Both input side voltage and input current are sampled. The control element is adjusted so as to maintain a desired relationship between input voltage and input current. This may be done by maintaining a constant ratio between input voltage and input current, thereby synthesizing a resistive load. More complex voltage/current ratios may be designed for, and voltage/current ratio may be adjustable. Power electronic loads may also be programmed to sample the frequency of AC current input and maintain desired frequency characteristics.

With reference to FIG. 8, a block schematic diagram of an adjustable threshold constant incremental resistance power electronic load is depicted. The power electronic circuit itself is called in the art a boost converter. Electrical current flow is from the source (DC generator 15), through an inductor 47, through a switching control element (transistor) 43, and back to the source (DC generator) 15. A high voltage load in the figure shown as battery 21, is also connected to the switching control element 43, through a diode 49. In operation, the switching control element 43 is alternately closed and opened at a rapid rate. When the control element is closed, the source (DC generator 15) is short circuited through the inductor 47, storing energy. When the switching control element 43 is opened, the inductor 47 attempts to maintain current flow, and forces current through the high voltage load 21, dissipating the energy stored in the inductor 47.

The current flow from the source is controlled by the duty cycle of the switching control element 43. Normally, the output voltage would be sampled, and the input current would be adjusted to control output voltage. In the present usage, the input voltage is sampled by voltage sensor 35, and current is sampled by current sense 33. The input voltage and current are sampled prior to the switching control element 43. A threshold voltage 37 is subtracted from the input voltage using a rectifier 59. The voltage above threshold is now compared with a scaled voltage that is proportional to the current. This is done by comparator 39. Any difference between sensed current and desired current is used to drive an integrator PWM unit 41, which adjusts the switching control element 43. In the case that current flow is exactly that desired, the input to the integrator 41 will be constant, the integrator output will be constant, and the switching control element 43 will maintain its desired state.

With a power electronic load, the input is controlled, and the output is varied to maintain the appropriate input. For example, a power electronic load synthesizing a resistor will reduce its current consumption in the event that supply voltage is reduced. Output voltage and current will change as appropriate to the new power level. The output may be, for example, a high voltage traction battery used in a hybrid electric vehicle. The power supplied to this battery would change in a fashion controlled by the input voltage to the power electronic load.

Example 4

Power Electronic Pseudo-Resistive Load with Energy Storage

With the addition of energy storage needed for smooth supply of electrical power to the final load, additional options are available for a power electronic load. A suitably designed power electronic load may be capable of sourcing as well as absorbing power. In some cases, such capability is an inherent part of the load design, in other cases a load must be designed specifically for power sourcing applications. The embodiment may be understood with reference to FIG. 1a. Prime mover 11, which may be a heat engine, is connected via a shaft 13 to generator 15. Control mechanism 19 is connected to the output of generator 15, and is connected to an energy storage unit 21 and to an eventual load 22. The control mechanism 19 in the present embodiment takes the form of a power electronic load, also referred to as a power electronic converter. The power electronic load is capable of controlling the generator power output and also of sourcing power for the generator from the energy storage unit 21. The present example will function with a brush comutated DC generator, or with a brushless DC motor modified with suitable back diodes so as to be capable of generator operation.

The inverter drive for an induction generator must be capable of supplying power to the generator, operating the generator as a motor. This is necessitated by the fact that induction machines consume reactive power. Reactive power means that current and voltage are not in phase, and that energy is circulating between the generator and the inverter. An inverter must therefore include a small amount of energy storage, and must be capable of sourcing a small amount of energy. With the addition of more extensive energy storage on the DC link, the generator may be caused to act as a motor for an extended period.

In the case of a DC generator with independent excitation, the generator may be caused to act as a motor by reversing the flow of armature current through the machine. With reference to FIG. 7, a power electronic load is designed so as to operate with positive incremental resistance and with current sourcing. This "load" actually supplies 10 amperes of current until a programmable threshold voltage, at which point current consumption increases at a rate of 0.4 amp per 1 volt change, or an incremental resistance of 2.5 ohms. At 25 volts above the threshold voltage current is zero, and as voltage rises current consumption increases. The power electronic load is further designed to never draw more than 50 amps, thus, preventing generator overload. However, in conditions of excessive rotational velocity, the generator is allowed to go into overload in order to prevent an engine over-speed condition. The power electronic load supplies electrical power to a high voltage traction battery. Generator voltage is directly related to rotational speed, while generator torque is directly related to current draw, in this example using the same sample generator as Example 1. Thus, each electrical load line, selected by selecting controller threshold voltage, may be assigned to a generator torque/speed curve.

Below the threshold voltage, current flows through the generator in the opposite direction of the generator produced voltage; electrical power is being supplied to the generator and the generator is acting as a motor. The power electronic load in this case is acting as a power electronic power supply, producing a terminal voltage which is greater than the generator voltage, thus, causing current flow through the generator. For the example generator, a current of 10 amperes corresponds to a force of 50 newton meters. As the threshold voltage is reached, current supplied to the generator is reduced, and the generator ceases to act as a motor, and begins to supply power to the load. Equilibrium between engine torque and generator torque load is as before; power output is adjusted by changing the position of this equilibrium by changing the threshold voltage.

Note that the transition between motor cranking, to start the engine, and generator operation, in order to generate electricity, is entirely automatic. If the engine is slow to start, then the engine will not produce torque, and the generator system will continue to act as a motor. Further, there is no need to know the exact speed of the engine. Rather, the threshold voltage is controlled based upon the desired power output. If the system power output is less than desired, then the threshold voltage is increased. Similarly, if too much power is being produced, then the threshold voltage is decreased. Power output may thus be controlled over a large power range.

A circuit may be implemented with the above DC active load with energy storage. With reference to FIG. 8A, a DC generator 15 is connected by means of an inductor 47, a transistor (switching control element) 43, and a diode 49 to a battery 21. The control circuitry, transistor drive circuitry, voltage and current detection means, as well as the specifics of the transistor and diode components, are also included. The battery voltage is higher than the generator voltage, and the configuration of inductor 47, transistor 43, and diode 49 is known as a boost converter. During operation, the transistor 43 is switched on and off at a rapid rate. When the transistor 43 is on, the generator 15 voltage is applied to the inductor 47, causing current to flow and energy to be stored in the inductor 47 magnetic field. When the transistor 43 is switched off, the energy stored in the inductor 47 is used to maintain current flow. The voltage across the inductor 47 changes, increasing to the point that the diode 49 conducts, and energy stored in the inductor 47 is supplied as a charging current to the battery 21.

With reference to FIG. 8B, the addition of an additional transistor 55 and diode 51 allow for similar operation with the additional capability of supplying power from the battery 21 to the generator 15. When operating as a load, transistor 43 is switched as above. With transistor 43 off, power supply capability is as follows. Transistor 55 is switched on. As the battery 21 voltage is greater than the generator 15 voltage, current flows through transistor 55, the inductor 47, and then to the generator 15. This causes the generator 15 to act as a motor. To regulate the current through the generator 15, transistor 55 may be switched at a rapid rate; the duty cycle of transistor 55 controlling the current supplied to the generator 15. The catch diode 51 and inductor 47 act to provide continuous current flow even as transistor 55 is switched on and off. When transistor 55 is switched off, the inductor will maintain current flow, the current flowing through the diode 49. Transistors 43 and 55 are restricted to not being on at the same time. Transistor 55, the catch diode 51, and the inductor 41 form a "buck" converter for supplying power from the battery 21 to the generator 15. It may be possible to dispense with the inductor 47 entirely, depending solely upon the natural inductance of the motor itself to provide current smoothing action.

Interface of this embodiment of the present invention to an external load is particularly easy. This may be seen on FIG. 1b. A load 22 is designed so as to consume power at the battery 21 nominal voltage. This may be, for example, the motor of an electric car, operated through a suitable controller. The generator controller, shown as input 65, monitors the state of charge of the battery 21, though the simple expedient of measuring actual battery voltage. The dotted lines electrical connectors 17 show this embodiment in which the input 65 (also referred to as the generator controller) takes a measurement from the voltage of the battery 21. In response to increasing depth of discharge, or to increasing rate of discharge, the generator controller shown as input 65 would command an increase in power electronic load 19 threshold voltage (37, in FIG. 8b). This would move the engine 11/generator 15 equilibrium point to higher speeds and power levels. Additional fuel would be consumed, additional power would be delivered to the battery 21, and the battery 21 would be recharged. As the battery 21 achieves full charge, or as the rate of discharge decreases, the input 65 would command a decrease in power electronic load 19 threshold voltage (37, in FIG. 8b). This reduces the speed of engine 11/generator 15 equilibrium, and less power would be delivered to the battery 21.

Example 5

Resistive Load with Excitation Control

Generator voltage is directly related to the rotational velocity of the generator rotor. Generator voltage is also directly related to excitation level. At the same rotational velocity, doubling excitation level will roughly double generator output voltage. Doubling excitation level will also double torque for a given output current level. The effects of armature reaction are ignored in this description, since they do not affect the general trends described. If excitation is doubled, with a constant resistive load, then output voltage will be doubled, current flowing through the load will double, and generator torque load and power output will increase by a factor of four. This increase in torque load will cause the engine/generator system to slow down.

Doubling the excitation level will have roughly the same effect as quartering load resistance. A change in excitation level may be understood having the same effect as a change in resistance equal to one over the square of the excitation change.

The method of the present example embodiment is applicable to DC generators with separate excitation. It is also applicable to AC synchronous generators with variable excitation when operating frequency independent loads.

In an exemplary embodiment, a diesel engine provides mechanical power to an AC synchronous generator with external excitation. Electrical power from the generator is used to operate an electrical resistance heater. The diesel engine has a fixed fuel injection setting.

When it is desired to increase the heat being produced by the heaters, the generator excitation is reduced. This causes the engine/generator system to speed up, until equilibrium is achieved at a higher rotational velocity, with higher voltage and current. When it is desired to reduce the heat being produced by the heaters, the generator excitation is reduced.

Example 6

Battery Load with Alternator

Of particular value for automotive applications is the use of an alternator as the generator. An alternator is essentially a brushless DC generator, comprising a stator with a three phase winding, and a wound rotor producing a suitable magnetic field, and suitable rectifiers on the stator circuit to provide a DC output. In most alternators, the excitation is provided by means of current supplied to the wound rotor by means of slip rings. Excitation is generally controlled in an automatic fashion in order to maintain a fixed output voltage over a wide load range. The alternator is of particular value because it is already in common use for automotive applications.

With reference to FIG. 9C, an engine 11 and alternator 63 connected for use in the method of the present invention is shown. In this case, the alternator 63 presents the primary load on the engine 11, rather than a minor secondary load. The three-phase stator winding connects by means of the full wave rectifier 67 to the battery 21. Control is provided by means of excitation change, similar to example embodiment 5 described above. Excitation control is not shown, but is included in alternator 63. The battery 21, however, presents an extremely non-linear load. At low rotational velocity, alternator 63 output voltage is lower than battery 21 voltage, and the diodes 91 are back biased. Output current is thus, essentially zero, and alternator 63 torque load is minimal. As the alternator 63 output voltage becomes comparable to battery 21 voltage, current and torque increase rapidly, limited only by the extremely low resistances of the battery 21 circuit and by armature reaction. Input 65 represents an adjustable power setting. Inlet 61 represents the fuel and the air inlet to the engine. Shaft 13 connects between the engine and the alternator.

With reference to FIG. 9B, a graph of torque versus speed for both an internal combustion engine and for an alternator supplying a battery type load, operating at various levels of excitation is shown. The abscissa of the graph represents speed in radians per second, while the ordinate of the graph represents torque in newton meters. Curve M represents the torque of the engine, with positive ordinate values representing power output of the engine, that is torque in the direction of rotation. Curves G, G', G", G'", etc. represent the torque of the alternator with various excitation levels, with positive ordinate values representing power consumption of the generator, that is torque in the direction opposite that of rotation. The exact location of the threshold points on the torque/speed curves will depend upon the state of charge of the battery, but the general nature of these curves will remain unchanged.

As may be noted from the diagram, engine/alternator power output is increased by a reduction in excitation, and reduced by an increase in excitation. This may be understood in the context of the present invention as follows: at a given equilibrium rotational velocity, an increase in excitation will cause an instantaneous increase in power output. This increased power output is not matched by engine power output, thus the engine/alternator system must slow down. This slowing stops when a new engine/alternator equilibrium is attained. Similarly, a reduction in excitation causes an instantaneous reduction in electrical power output, leaving the engine with excess power to accelerate the system. As the engine is operating in wide open throttle configuration, engine rotational velocity will determine fuel consumption and power output.

An automotive alternator does not normally act as a motor, as the rectifiers are passive commutation devices. However, with the addition of switching elements 93 and a rotor position sensor 69, an alternator may be modified to act as a brushless DC motor, a modification that allows the alternator to act as the starter for the heat engine.

Example 7

Generator in Engine Synchronized Periodic Motor Action

The introduction of energy storage and motoring of the generator permits further benefit to be had from the present invention. In heat engines, inertia (the energy of motion of an object) is an important factor. During the engine power cycle, inertia carries the pistons through the power absorbing strokes. To enhance this mechanical energy reserve, a flywheel is placed on the crankshaft to which the pistons are connected. The engine must be operating rapidly enough for sufficient energy to be stored in the motion of the flywheel to allow for the completion of power absorbing strokes. If the engine is operating too slowly, it will stall.

Traditionally, a small electric motor is used to start the engine. This motor, also known as the starter, is coupled to the engine and is started by closing a circuit to an independent energy source, usually a battery. When started, the starter rotates the engine until sufficient inertia is reached and one piston can carry the rest of the pistons through their power absorbing strokes on its own. Once the desired speed is reached, the starter is mechanically disconnected from the engine.

As mentioned above, numerous generator designs may be operated as motors, given suitable electronic control and a source of electrical power, such as a battery. The generator, temporarily acting as a motor, may replace the starter to initiate engine operation. Once the engine gains sufficient momentum, the generator is reset to its original function and the power is provided by the engine. This eliminates the need, and with it the cost and the complication, of a separate starter unit.

As described above, several generator/load combinations act as motors at low speed, transitioning to generator operation engine speed passes a particular threshold. In the method of the present invention, this threshold is controlled by various means suitable to the generator and load. Further, several generator/load combinations display rapid changes in torque with rotational velocity, meaning that a small change in rotational velocity will cause a large change in generator torque load. Such a "stiff" generator, if capable of motor operation, will act as the flywheel of the engine. During power absorbing strokes, the engine/generator system will slow down slightly, and the generator will begin to act as a motor, supplying the necessary energy to the pistons. During power strokes, the engine/generator system will speed up slightly, and the generator will output electrical power to the battery.

Similar results may be obtained through the use of a position sensing mechanism mechanically coupled to the engine, which would command the generator/load controller to appropriate torque levels at appropriate times during the engine power cycle. Such added complexity may beneficially improve efficiency.

There are two particular advantages to the present example embodiment. First, energy stored in a flywheel increases as the square of the rotational velocity. As the engine slows down, a point may be reached where insufficient energy is stored in the flywheel to carry the engine through energy absorbing strokes, and the engine will stall. The electrical energy storage does not show such a low speed limit; thus, an engine operated in the method of the present invention will be capable of operation at arbitrarily low speed, and thus, arbitrarily low power output. Second, the use of the generator and battery in place of the flywheel will allow for the use of single cylinder engines, which are simpler, have smaller surface area to volume ratios, and are more efficient.

Example 8

Another Embodiment of a Generator in Engine Synchronized Periodic Motor Action

A single cylinder diesel engine is coupled to an induction generator. The system is operated by electric control that is supplied with DC power by a battery. The electronic control is able to electronically manipulate the current and frequency of the power input to the induction generator. The control is further able to draw power from the battery and provide suitable AC excitation and power to the generator, or to supply suitable AC excitation to the generator while rectifying real power from the generator and supplying power to the battery.

Initiation of system operation is as follows. The control system operates as an inverter to synthesize alternating current of suitable voltage, frequency, and phase so as to cause the generator to operate as a motor, and accelerate the diesel engine to operational speed. The generator, driven by power provided by the control, from the battery, rotates the engine through the intake and compression strokes. Depending upon system inertia, generator torque, and generator synchronous speed, the system may reach the normal operating range at this point, or may take several power cycles for the system to reach the operating range. The normal operating range is that speed range from a few percent below to a few percent above the generator synchronous speed. At the operating range, during the power stroke, the system will speed up above the generator synchronous speed, causing the generator to produce electricity. Then during the power absorbing strokes, the system will slow down below generator synchronous speed, causing the generator to act as a motor, and provide mechanical power to push the heat engine through the power absorbing strokes. Through control of generator synchronous speed, the average system speed may be controlled, thereby controlling the power output of the system. It may be noted that there is no requirement to detect the actual speed of the engine, nor is there need for a sensor to determine the position of the engine in its power cycle. The engine will naturally vary its speed about the synchronous speed of the generator, and power production may be controlled through control of engine synchronous speed.

Example 9

Figure 10:
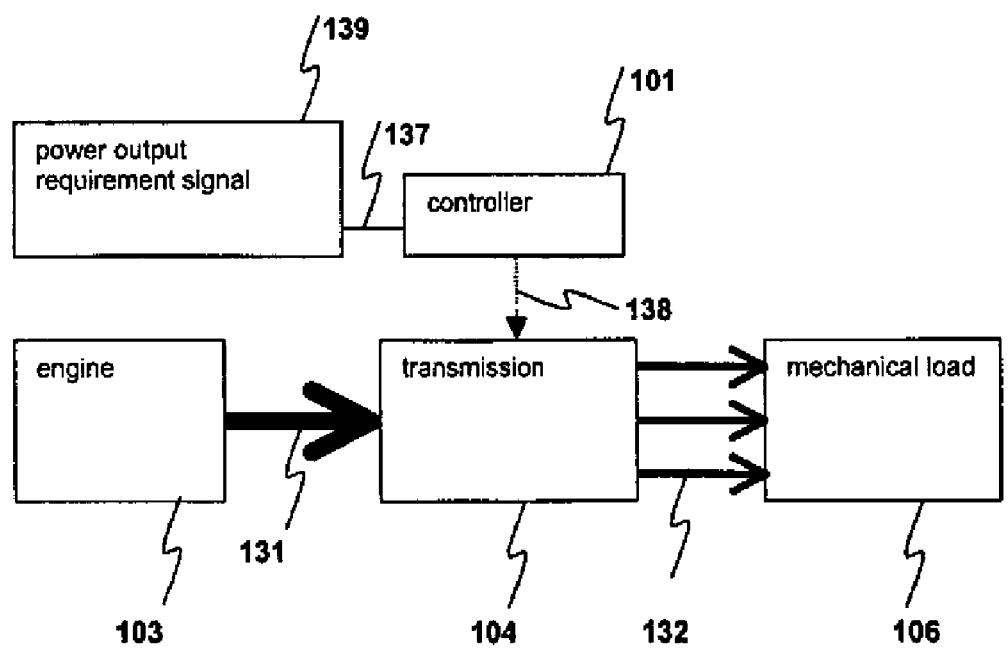
FIG. 10 shows the component parts of the drive train; the engine, transmission and controller, and mechanical load.
Figure 11:
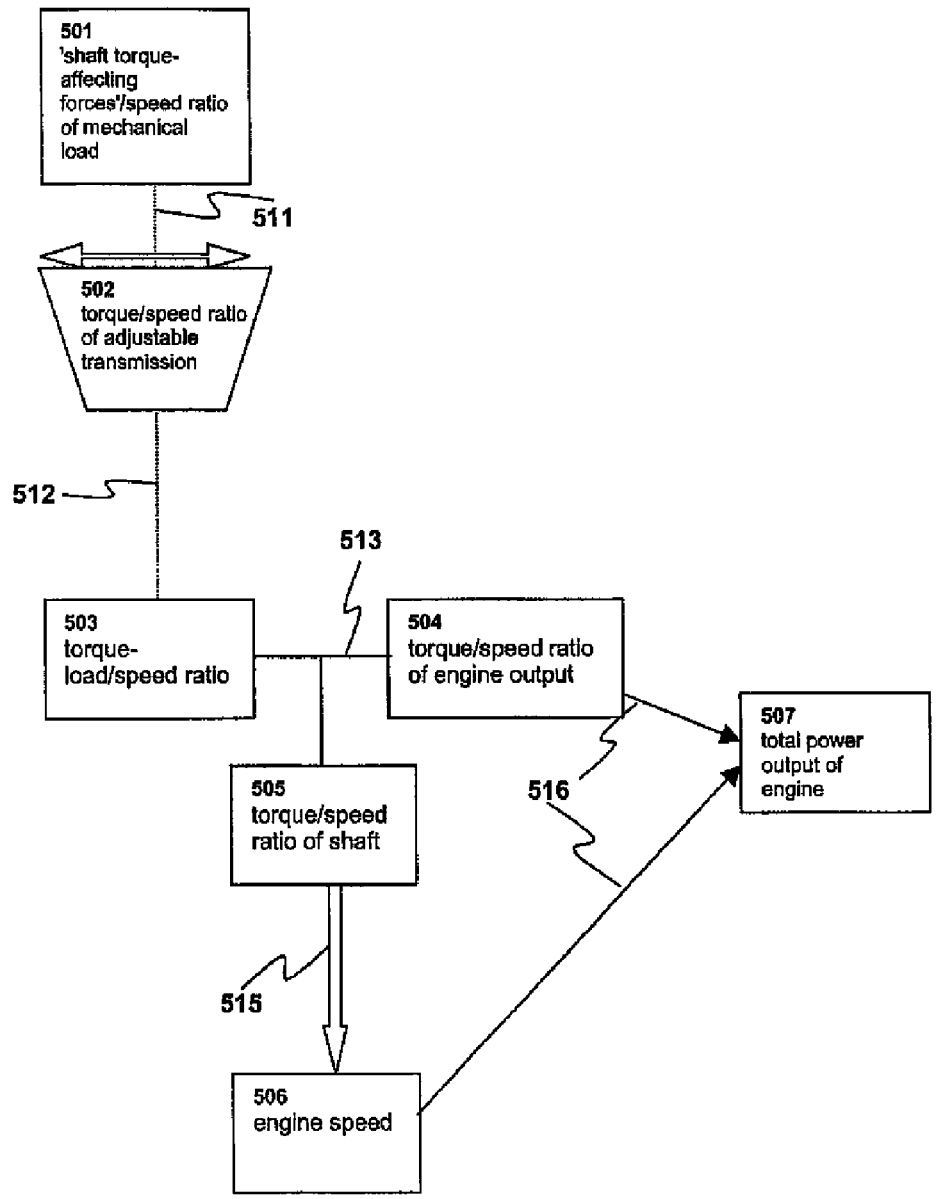
FIG. 11 represents the functional characteristics of the present invention.

This embodiment is shown in FIG. 10. Apparatus includes an unthrottled engine, 103, a transmission 104, operated by a controller 101, and a mechanical load 106. Operation of the system is displayed graphically in FIG. 11. Box 501 represents the forces provided by the mechanical load which affect the torque on the engine output shaft, as a function relative to the speed. Line 511 represents these forces being applied to the transmission. Trapezium 502 represents the adjustable torque/speed ratio of the transmission. This may be done actively by a user or by an electronic controller. Line 512 represents the application of the torque load to the engine output shaft relative to the speed. Box 503 represents the effect of the torque load on the engine output shaft, while Box 504 represents the effect of the torque output of the engine on the same shaft, both relative to the speed, but which is equal since they are being applied to the same shaft, as implied by line 513. Box 505 represents the net torque/speed ratio of the engine output shaft. Arrow 515 shows that the net torque/speed ratio of the shaft affects the Engine Speed of Box 506. Box 506 represents the engine speed as dependent on the shaft torque/speed ratio, and the engine speed self-adjusts according to this ratio. Arrows 516 point to Box 507, to indicate that the total engine power output is a product of the Engine Speed of Box 506 and the engine torque, which varies according to the engine torque/speed relation of Box 504.

In operation, a desired engine power output is determined or selected, and a control means acts to set the transmission ratio to a particular value so that the torque/speed characteristics of the load, as reflected through the transmission, will come to an equilibrium with the engine torque/speed characteristics at a particular desired power output. The control means may include control heuristics which incorporate features such as graphs of torque speed characteristics of the engine, calculation techniques, preprogrammed data sets, etc. Alternatively, the control means may be simpler. For example, the control means may comprise only the ability to read a signal to increase and to decrease the engine power output. It may be programmed to respond to these signals by decreasing or increasing the gear ratio one gear at a time, until the desired power output is accomplished. A sample program to produce this is shown in FIG. 12a. In a related embodiment, the control may have the means to differentiate between a large required power output change, and a small one. In this embodiment, the control may be able to implement first a large gear change, and then cycle to a more exact gear. A sample script for producing this is shown in FIG. 12b.

In a particularly simple embodiment, where desired engine power outputs are restricted to a discrete range, the control may comprise only a small set of possible gears each matched to a particular desired engine power output. In a further embodiment, the control may comprise an automatic transmission or a continuously variable transmission, and a map showing which substantially exact gear ratio would produce each required power output. In a further embodiment, the engine speed/torque characteristic is nearly linear, or nearly follows a specific curve, and the control treats it as if it were exactly linear or as if it followed the specific curve. In this way the power output requirement will be substantially met, but not necessarily exactly.

Figure 13:
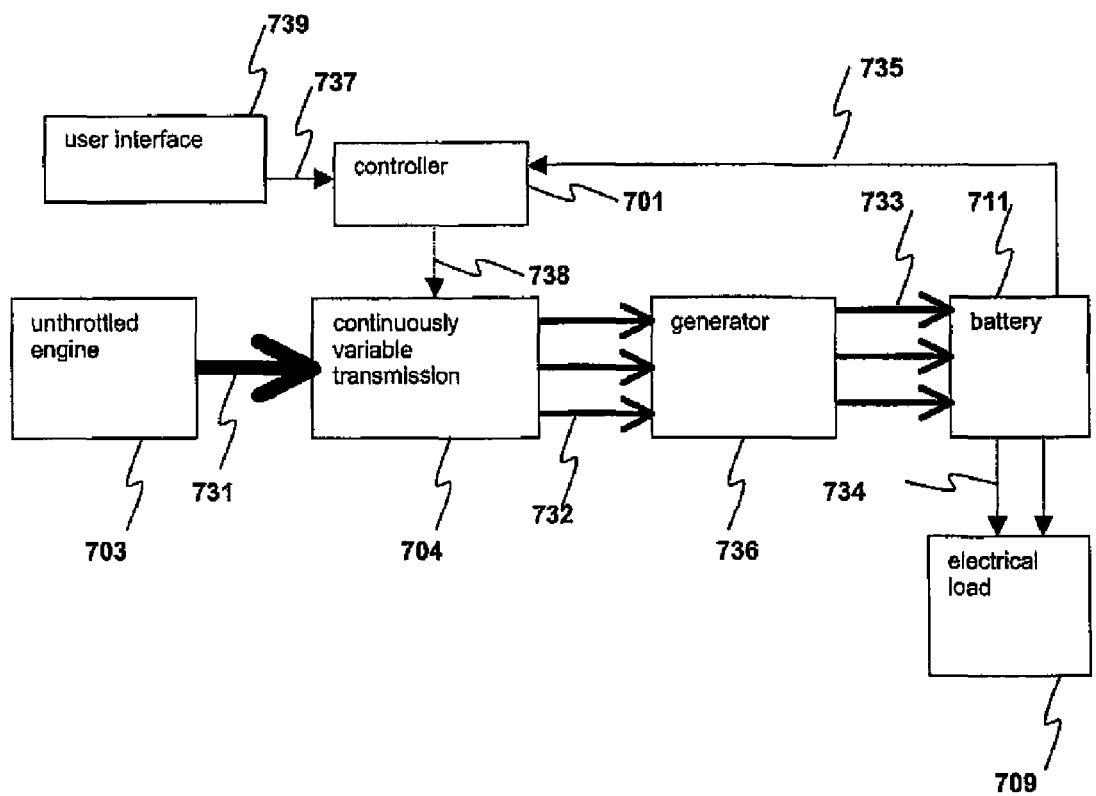
FIG. 13 represents the operational features of a first embodiment of the present invention.

Referring now to FIG. 13, a simple system including a generator as the mechanical load, and with the addition of a battery is shown. The unthrottled engine 703 provides a mechanical power output 731 of a certain speed and torque to a transmission, 704, preferably but not limited to, a continuously variable transmission (CVT). The controller 701 operates the CVT, and, causes the transmission to apply a gear ratio to the power, transmitting the power to the generator 736 with (unless operating at a gear ratio of 1:1), different torque/speed characteristics. The torque or torque load is represented by the thickness of the arrows in groups 731 and 732, while the speed is represented by the number of arrows in groups 731 and 732. Besides for frictional losses in the transmission, the total power on both sides of the transmission is equal, only varying in torque versus speed characteristics. Generator 736 uses the mechanical input and converts the power to electrical power, according to its impedance and other characteristics, to output electrical power with current/voltage characteristics (represented by arrows 733) directly linked to the torque/speed characteristics of the input mechanical power (represented by arrows 732). This electrical power is supplied to the battery 711. If the generator is AC, suitable rectification or other transformation of the power will be required before it can be supplied to the battery—this has not been shown on the diagram since it is well known in the art. The electrical load 709 may draw electrical power according to its electrical requirements 734 from the battery.

The controller 701 receives a power output requirement signal to determine the ratio of the CVT. This may be by a measurement of the rate or state of discharge of a battery 711, using a gauge 735. Alternatively, it may be an independent user interface 739 providing a signal 737 to the controller 701. The user interface 739 may be pressure on an accelerator pedal in a car. The signal may also originate from other feedback means, such as torque or speed measurements of the engine or of the mechanical load, etc. (not shown). The controller 701 may also comprise or be linked to the battery 711

The mechanical load may be of a varying nature, it may comprise the wheels of a car, etc, or a generator, to convert rotary mechanical power to electricity. The mechanical load may also be any similar device known in the art. In the case in which the load is a generator, it could furthermore be capable of motor action, as will be extremely useful in a further embodiment, described below. Another feature of the generator is that its frequency may be fixed or variable.

The torque/speed characteristics of many generators are such that will output electricity with a frequency directly related to the rotational velocity of its mechanical input. Therefore, as the transmission ratio is changed (in order to control the engine output), the speed of the generator's mechanical input is changed too, which affects the torque load that the generator applies to the transmission, thus changing the torque load on the engine. Furthermore, as the speed of the engine changes, this will once again affect the torque load of the generator, according to the torque/speed characteristics of the generator. The torque/speed characteristics of such generators and their effect on the engine speed must therefore be taken into account by the control means, so that the selected transmission ratio, when reflecting the torque/speed characteristics of the mechanical load, accurately produces a torque load that causes a desired equilibrium with the engine.

The engine, according to the present invention runs at all times in an unthrottled state, although a throttle may be provided for use during emergencies or for a speedy total system shutdown.

These gearing changes may, in some cases, provide a less instant change in speed input to the mechanical load as gearing change in the conventional sense might produce—since, in the conventional usage, the gear changing simply changes the torque/speed ratio of a steady engine power output, whilst in the method of the present invention, the gearing change may require time to vary the engine power output before the desired mechanical load power input is achieved.

An additional feature that may be useful is energy storage means, such as a battery, to provide the mechanical load which extra speed during the brief periods of time during which the engine is changing speed and does not provide the desired power output of the mechanical load. This feature would mainly be useful if the mechanical load is a generator/motor, and can draw power from the battery. However, in many circumstances, this period of power output change is not noticeable or problematic, and the energy storage may be eliminated. The energy storage could also be used to sink apparent surges of power during engine deceleration.

In a vehicle, or similar mechanical load, the present invention could be used with or without energy storage. The engine would be coupled to the wheels via a transmission. Without a generator in the system, it would be recommended to enable the use of at least regenerative braking or some other power absorber (at least a brake), to absorb the surge of excess speed during the period between a desired deceleration is registered and the engine actually decelerating. In the case of a driven system without energy storage, an increase in power output requires that the heat engine accelerate. This requires a temporary reduction in power output as the transmission gear ratio is reduced and the torque/speed equilibrium between engine and transmission shifted to higher speed. Depending upon the nature of the driven load and the magnitude of the gear ratio change, this may cause the driven load to stop accelerating, slow down slightly, or slow down considerably. Smaller rates of change of gear ratio will mitigate these speed deviations, at the expense of reduced system response. Alternatively, a throttle or other engine-slowing device may be fitted for use in total shutdown and emergency stops.

In an embodiment of the present invention in which the mechanical load is an AC generator, the speed and torque variation may not be appropriate for the electrical power required by the electrical load on the AC generator. In this case, the use of an inverter on the output link between the AC generator and the electrical load on the generator may be required. With the addition of an inverter, DC energy storage means becomes a viable option for extending the operational envelope. Firstly, with the addition of a battery, the electrical load can draw a steady supply of power, with adequate backup supplies that the electrical load may never notice the output changes as the engine changes speed. Secondly, the spare electrical backup can be used, to help the transmission make engine speed changes faster. The engine speed can be accelerated faster if the generator is able to manage with little or no power consumption during the period of speed change. This is possible when there is a backup electrical supply for the electrical load. The control is able to shift gears right down to the lowest gear immediately, without concern for the resultant sharp speed decrease of the generator. In fact, if the generator is capable of acting as a motor, the control can shift gears so far that the transmission speed is low enough to cause the generator to reverse operation and begin motoring. In this case, the engine will be further helped to pick up speed by the input from the motor. Similarly, the engine speed can be decelerated faster if the generator is able to dump a lot of power at once into the energy storage. The control is able to shift gears right up to the highest gear required immediately, without regard for the fact that the generator may be greatly overproducing power for a brief period of time.

Energy storage could similarly be used when the mechanical load is a DC generator or a rectified AC generator.

A further feature of the present invention is particularly useful if the generator is an induction generator. An induction generator may have a characteristic of a very high current to voltage ratio characteristic, for example if it connected to a fixed frequency inverter, and is able to draw current according to its voltage. In the present invention this feature may be used to specific advantage. Since the engine is unthrottled, engine speed is greatly affected by the current draw of the generator, which translates directly into torque draw, or otherwise described as torque exerted onto the engine. In the undesirable eventuality of the engine speed being perturbed, perhaps because the engine is knocked, the steep torque versus speed relation of the generator helps to bring the engine back to the correct speed. If the engine accidentally speeds up, the voltage of the generator (which is directly linked to engine speed) increases with the engine speed, and the current draw of the generator increases sharply. In other words, the torque exerted by the generator on the engine is automatically increased in sharp proportion to the speed increase, bringing the speed back to equilibrium. Similarly, if the engine speed is accidentally decreased, the sharp torque versus speed relation of the generator means that the generator greatly drops in torque application to the engine, allowing the engine to quickly speed up.

This further feature with induction generators can be used throughout engine operation. Many engines, such as four stroke and diesel engines, have a period in which they are firing, applying power, and periods during which they are taking in fuel, and compressing it. During these latter periods, the engine may be simply not producing power, or even absorbing power. These cyclic variations of the engine cause the engine speed to fluctuate a little. As mentioned, the induction generator with a high torque to speed relation will ease its torque application on the engine automatically and immediately during periods when the engine speed is reduced, such as when the engine is involved in power absorbing strokes. In this way, the speed of the engine is maintained even during the variations of each portion of the engine power output cycle. Therefore, the need for a flywheel is reduced or even eliminated.

When the induction generator is also configured as a motor, and with the addition of an inverter, or rectification, and energy storage, the induction generator becomes able to actively help the engine during periods of acceleration and power absorbing strokes. The torque to speed ratio characteristic can be set so steeply that the slowing down of the engine during power absorbing strokes causes the generator to transition right down, below zero torque application on the engine, right down to motoring mode, in which the generator applies a torque on the engine in the same direction as the engine's output torque. In this way, the generator actively helps the engine during power absorbing strokes, as well as during other eventualities in which the engine's speed is perturbed.

Example 10

In a further embodiment, the mechanical load is an AC generator. The generator is built with more than three different electrical stator phases. The stator windings of each phase are connected to inverter phases in a meshed pattern. Various possible configurations following this theme are described in my U.S. Pat. No. 6,657,334 and my pending application Ser. No. 10/132,936 filed 26 Apr. 2002.

In U.S. Pat. No. 6,657,334, a high phase order induction motor is connected to a high phase count inverter. Rather than using a star connection for the high phase count machine, the motor is connected mesh, meaning that the two winding terminals of each motor phase are each connected to separate inverter output terminals, whilst each inverter output terminal is connected to two motor phase terminals. The three-phase mesh connection is well known in the art, and is commonly known as a delta connection.

Figure 14:
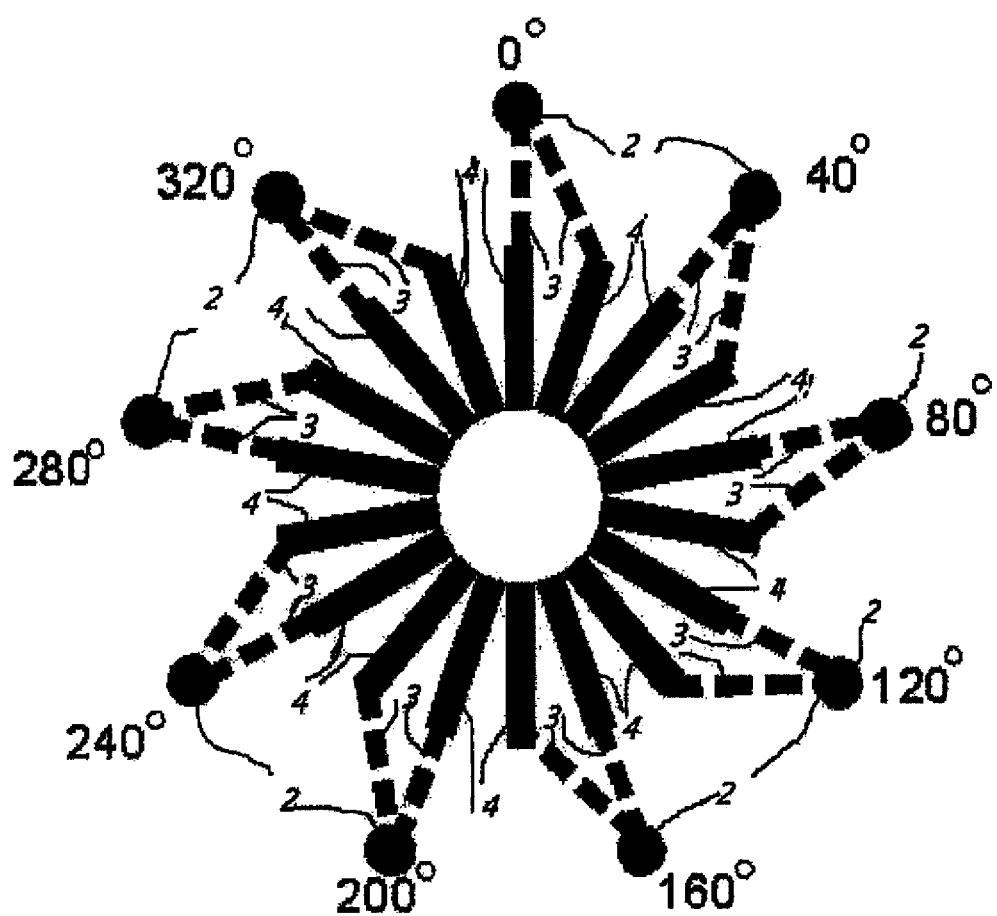
FIG. 14 illustrates how the winding terminals of a polyphase motor may be connected to a polyphase inverter.

In an induction machine, each phase winding set can be described by two terminals. There may be a larger number of terminals, but these are always grouped in series or parallel groups, and the entire set can be characterized by two terminals. In a star connected machine, one of these terminals is driven by the inverter or power supply, while the other terminal is connected to the machine neutral point. All current flows through one terminal, through the neutral point into other windings, and though the driven terminals of the other phases. In a mesh-connected machine, these two terminals are connected directly to two different supply points. An example of how this may be done is shown in FIG. 14, in which the stator slots 4 are shown as straight lines running down the inside of the stator, and inverter terminals 2, are shown as circles, alongside which is marked phase angles of each of the inverter terminals. Electrical connections 3 between the winding terminals in stator slots 4 and inverter terminals 2 are represented by dashed lines. Two winding halves are displayed opposite one another, and are actually joined to one another, although this is not shown. The configuration describes a 9 phase machine connected with an S=3 connection—identical to FIG. 15e.

In contrast to three phase systems, in which there are only three inverter terminals and six motor windings terminals, in a high phase count system with N phases, there are N inverter terminals and 2N motor windings terminals. There are thus a substantial number of choices for how an N phase system may be mesh connected. This set of choices is greatly reduced by rotational symmetry requirements, specifically each winding must be connected to two inverter terminals with the same electrical angle difference between them as for every other winding.

Figure 15A:
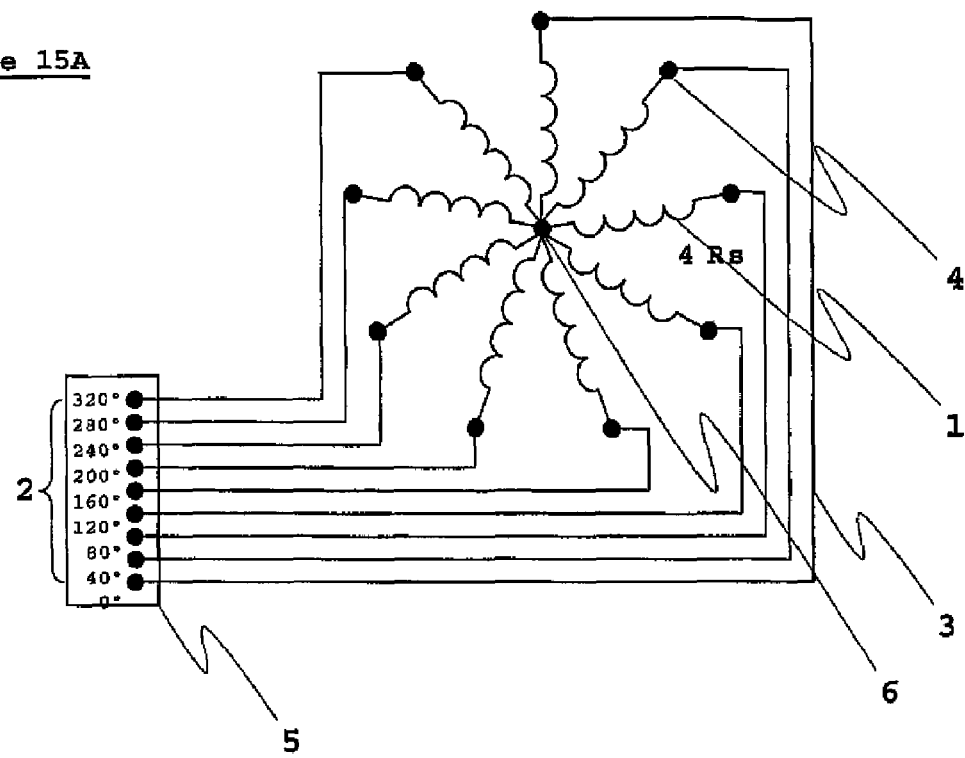
FIGS. 15a-e illustrate a plurality of ways in which the polyphase inverter may be connected to a polyphase motor.
Figure 15B:
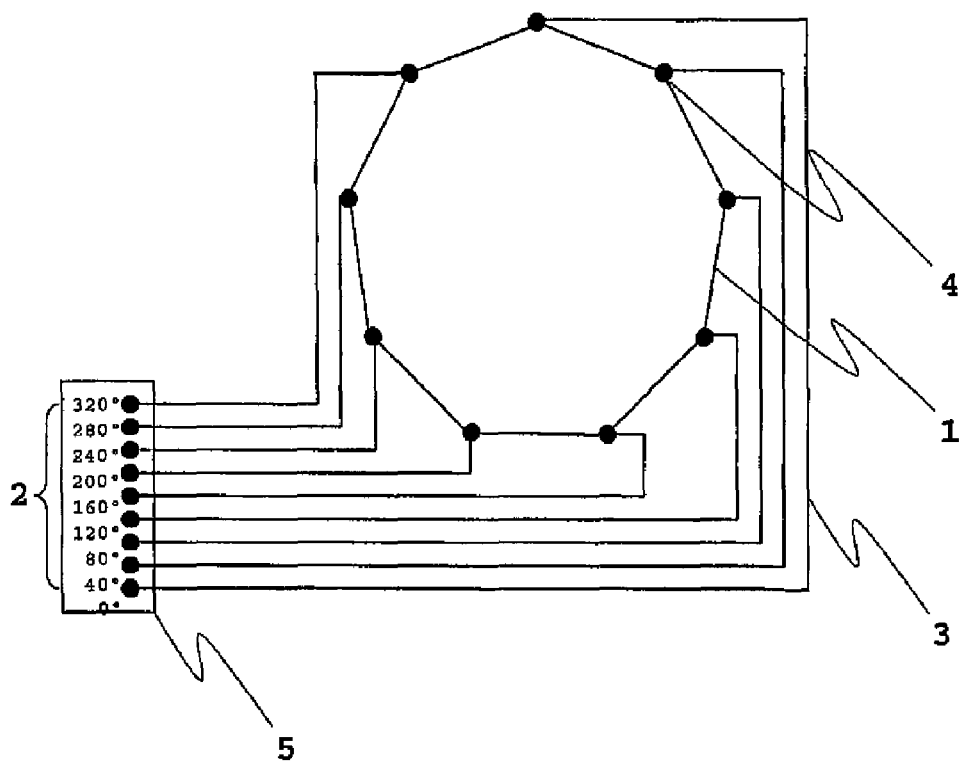
Figure 15C:
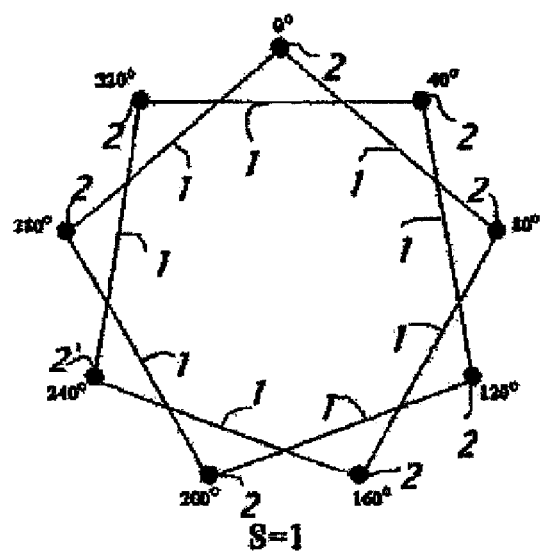
Figure 15D:
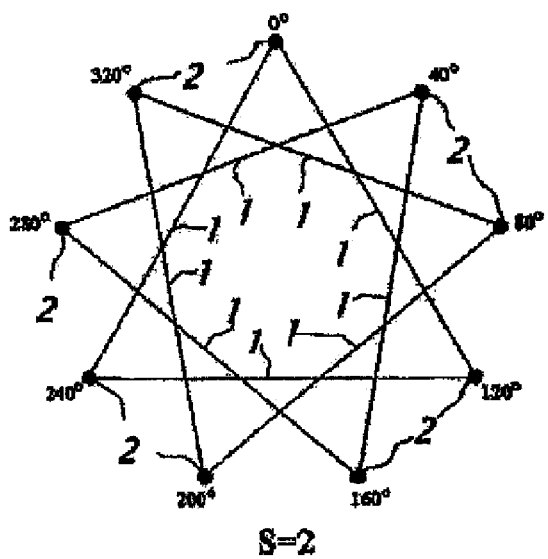
Figure 15E:
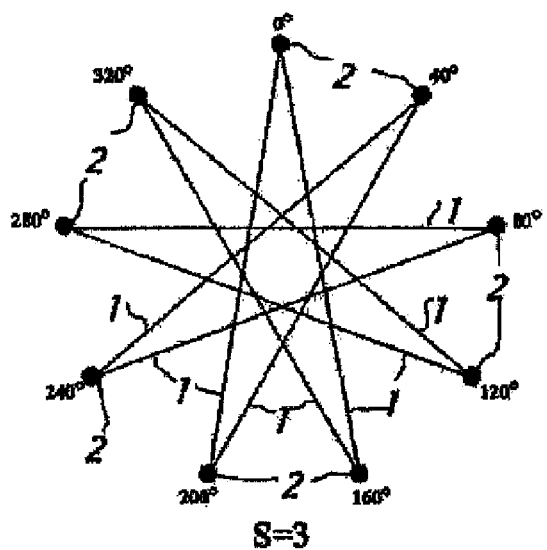

A simple graphical schematic of the permissible inverter to motor windings connections may thus be described for a polyphase motor having N phases. In the following embodiment, N is equal to 9, but it is to be understood that this limitation is made to better illustrate the invention; other values for N are also considered to be within the scope of the present invention. FIG. 15a shows 9 evenly spaced terminals 4 and a center terminal 6. Each of the terminals 4 represent one end of a motor winding 1 and the center terminal 6 represents the other end of the motor winding. An inverter 5 has 9 terminals 2, which are connected to one of the terminals 4 of each of the motor windings 1 via electrical connectors 3 as shown.

Permissible connections of the 9 phase windings are either from the center point, to each of the 9 points on the circle (this being the star connection shown as FIG. 15a) or from each of the 9 points to another point S skipped points distant in the clockwise direction, where S represents the number of skipped points (inverter terminals). This latter is shown in FIGS. 15b-e; in FIG. 15b motor winding 1 is represented by a line, and in FIGS. 15c-e inverter 5 and electrical connectors 3 have been omitted for the sake of clarity. It will be noted that for each S from 0 to 3 there is a corresponding S from 4 to 7 that produces a mirror image connection.

FIGS. 15a-e shows all permissible connections for a 9 phase system from S=0 to S=N/2-1 as well as the star connection. Noted on the star connection diagram are the relative phase angles of the inverter phases driving each terminal. For a given inverter output voltage, measured between an output terminal and the neutral point, each of these possible connections will place a different voltage on the connected windings. For the star connection, the voltage across the connected windings is exactly equal to the inverter output voltage. However, for each of the other connections, the voltage across a winding is given by the vector difference in voltage of the two inverter output terminals to which the winding is connected. When this phase difference is large, then the voltage across the winding will be large, and when this phase difference is small, then the voltage across the winding will be small. It should be noted that the inverter output voltage stays exactly the same in all these cases, just that the voltage difference across a given winding will change with different connection spans. The equation for the voltage across a winding is given by: 2*sin((phasediff)/2)*Vout where phasediff is the phase angle difference of the inverter output terminals driving the winding, and V is the output to neutral voltage of the inverter.

Thus, referring to FIG. 15, when S=0, the phase angle difference is 40 degrees, and the voltage across a winding is 0.684 Vout. When S=1, the phase angle difference is 80 degrees, and the voltage across the winding is 1.29 Vout. When S=2, the phase angle difference is 120 degrees, and the voltage across the winding is 1.73 Vout. Finally, when S=3, the phase angle difference is 160 degrees, and the voltage across the winding is 1.97 Vout. For the same inverter output voltage, different connections place different voltage across the windings, and will cause different currents to flow in the windings. The different mesh connections cause the motor to present a different impedance to the inverter.

To deliver the same power to the motor, the same voltage would have to be placed across the windings, and the same current would flow through the windings. However, for the S=0 connection, to place the same voltage across the windings, the inverter output voltage would need to be much greater than with the S=3 connection. If the inverter is operating with a higher output voltage, then to deliver the same output power it will also operate at a lower output current. This means that the S=0 connection is a relatively higher voltage and lower current connection, whereas the S=3 connection is a relatively lower voltage, higher current connection.

The S=0 connection is desirable for low speed operation, where it increases the overload capabilities of the drive, and permits much higher current to flow in the motor windings than flow out of the inverter terminals. The S=3 connection is desirable for high speed operation, and permits a much higher voltage to be placed across the windings than the inverter phase to neutral voltage. This change in connection is quite analogous to the change between star and delta connection for a three phase machine, and may be accomplished with contactor apparatus. However the number of terminals renders the use of contactors to change machine connectivity essentially impracticable.

There is, however, an additional approach available with high phase order inverter driven systems.

The inverter, in addition to being an arbitrary voltage and current source, is also a source of arbitrary phase AC power, and this output phase is electronically adjustable. Any periodic waveform, including an alternating current may be described in terms of amplitude, frequency, and phase; phase is a measure of the displacement in time of a waveform. In a polyphase inverter system, phase is measured as a relative phase displacement between the various outputs, and between any pair of inverter terminals, an electrical phase angle may be determined. In the case of conventional three phase systems, this electrical phase angle is fixed at 120 degrees. However in polyphase systems this phase angle is not fixed. Thus, while the machine terminals 1 . . . 9 may be fixed in their connection to inverter terminals 1 . . . 9, the phase relation of the inverter terminals connected to any given motor winding terminals is not fixed. By changing the inverter phase relation, the impedance that the motor presents to the inverter may be changed. This may be done without contactors.

With reference to FIG. 16, a 9 phase machine is connected to the inverter system using the S=3 mesh. One terminal of each of two windings 1 is connected to each inverter terminal 2. When driven with 'first order' phase differences, then the results are as described above for the S=3 mesh. However, if the phase angles are adjusted by multiplying each absolute phase reference by a factor of three, then the phase differences placed across each winding become the same as those found in the S=2 case, although the topological connectivity is different. If the phase angles are adjusted by a multiplicative factor of five, then the voltages across windings become like those of the S=1 case, and with a multiplicative factor of seven, the voltages become like those of the S=0 case. A multiplicative factor of nine causes all phases to have the same phase angle, and places no voltage difference across the winding.

These changes in phase angle are precisely the changes in phase angle used to change the operating pole count of a high phase order induction machine, as described in others of my patent applications and issued patents.

If a high phase count concentrated winding induction machine is operated by an inverter, but is connected using a mesh connection, then changes in pole count of the machine will be associated with changes in machine effective connectivity. These changes in effective connectivity permit high current overload operation at low speed, while maintaining high-speed capability, without the need for contactors or actual machine connection changes.

Of particular value are machines connected such that the fundamental, or lowest pole count, operation is associated with a relative phase angle across any given winding of nearly, but not exactly, 120 degrees. In these cases, altering the output of the inverter by changing the absolute phase angles by a multiplicative factor of three, which may also be described as operation with the third harmonic will result in the relative phase angle across any given winding becoming very small, and causing large winding currents to flow with low inverter currents. A particular example would be a 34 slot, 17 phase machine, wound with full span, concentrated windings, to produce a two pole rotating field. The winding terminations are connected to the inverter using the S=5 mesh. The relative phase angle of the inverter outputs placed across any given winding would be 127 degrees, and the voltage placed across this winding relative to the inverter output voltage is 1.79 times the inverter output voltage. If the machine is then operated with a third harmonic waveform, it will operate as a six pole machine. The relative phase angle across any given winding is now 127*3 mod 360=21 degrees, and the voltage placed across the winding relative to the inverter output voltage is 0.37 times the inverter output voltage. Simply by changing the inverter drive angles, the Volts/Hertz relationship of the motor is increased, and inverter limited overload capability is enhanced.

To determine the ideal S, the number of skipped inverter terminals between the winding terminals of each phase of the motor, which would result in the greatest change of impedance when the inverter drives the motor with substantial third harmonic, one would use the formula (N/3)−1, rounded to the nearest integer, for values of N (number of phases in motor) not divisible by 3. When N is divisible by 3, one would use the formula N/3 to determine the skip number.

Other connectivity is certainly possible. The connection described above will tend to maximize machine impedance for the third harmonic, but will actually decrease machine impedance for fifth harmonic. A connection that most closely approximates full bridge connection, e.g. the S=7 connection for the 17 phase machine described above, will show gradually increasing machine impedance for the $3^{rd}$, $5^{th}$, $7^{th}$, $8^{th}$, $11^{th}$, $13^{th}$, and $15^{th}$ harmonics. This may be of particular benefit, for example, with machines operated with square wave drive. Operation with high pole counts is not generally considered preferable, however it may be of benefit in the particularly desirable case of operating at high overload and low speed. The number of slots is not restricted, nor are the number of phases or poles. In order to determine the value of S (skip number) in the winding to inverter connections, one may use the formula (N−3)/2, when N (number of motor phases) is an odd number. When N is even by may be divided into subsets of odd phase counts, the formula may similarly be used for the odd subsets.

The general principal of the mesh connection may be utilized for the operation of high phase order induction machines including motors, generators, and motor/generators, and may also be utilized for different loads which require variable frequency supply, e.g. induction heating applications. Also, saturation of single harmonics are not required, and an exceedingly variable impedance may be produced by the gradual and increasing superimposition of harmonic content, for example, of the third harmonic. Alternatively, the motor may be configured to be operated primarily with third harmonic, and the temporal harmonic, which may be gradually and increasingly superimposed may be the fundamental current, to provide extra bursts of torque or speed.

The mesh connection has been described with regard to rotary induction motors, however it may be implemented with linear induction motors too, using similar techniques for changing winding impedance. Where the windings of a linear or also of a rotary induction motor comprise single inductors instead of coils, then inverter output phase angle may be altered by an even multiplicative factor in order to effect impedance changes. In some cases, the inverter may even multiply each phase angle by a fractional factor to vary the impedance of the motor.

The mesh connection has been described as a way of connecting a polyphase motor to a polyphase inverter. Furthermore, there have been described methods of electrically varying the impedance, and methods to design the windings to inverter connections in order to optimize such impedance variation. In this way, the same motor may act as though it has a high number of series turns for low speed operation, being supplied with high voltage and low current, yet still be able to reach high speeds as though the motor has relatively few series turns. Also, contactor arrangements are not essential However, an additional facet of the present invention provides for a plurality of inverter to windings connections to be set up in the same machine, e.g. in 9 phase machine, S=0 and S=3 could both be independently connected or available to be connected. Contactors or switches would be arranged in each terminal to change the way the windings are connected to the inverter terminals based on the dual arrangements set up in the machine. This is an example of another way in which the motor impedance may be controlled according to the present invention.

The word "terminal" has been used in this specification to include any electrically connected points in the system—this may be a screw, for example, or any electrical equivalent, for example, it may simply comprise a wire connecting two components in a circuit.

In a similar sense, inverter output elements are commonly half bridges, but they may alternatively comprise other switching elements. One embodiment of the present specification has described two winding terminals connected to a single inverter terminal. The single inverter terminal referred to is intended to also include electrical equivalents, such as a device made of two inverter terminals that are electrically connected together.

The mesh connection and the implementation techniques described here, from my other patent may be used in virtually all motor applications.

Figure 17A:
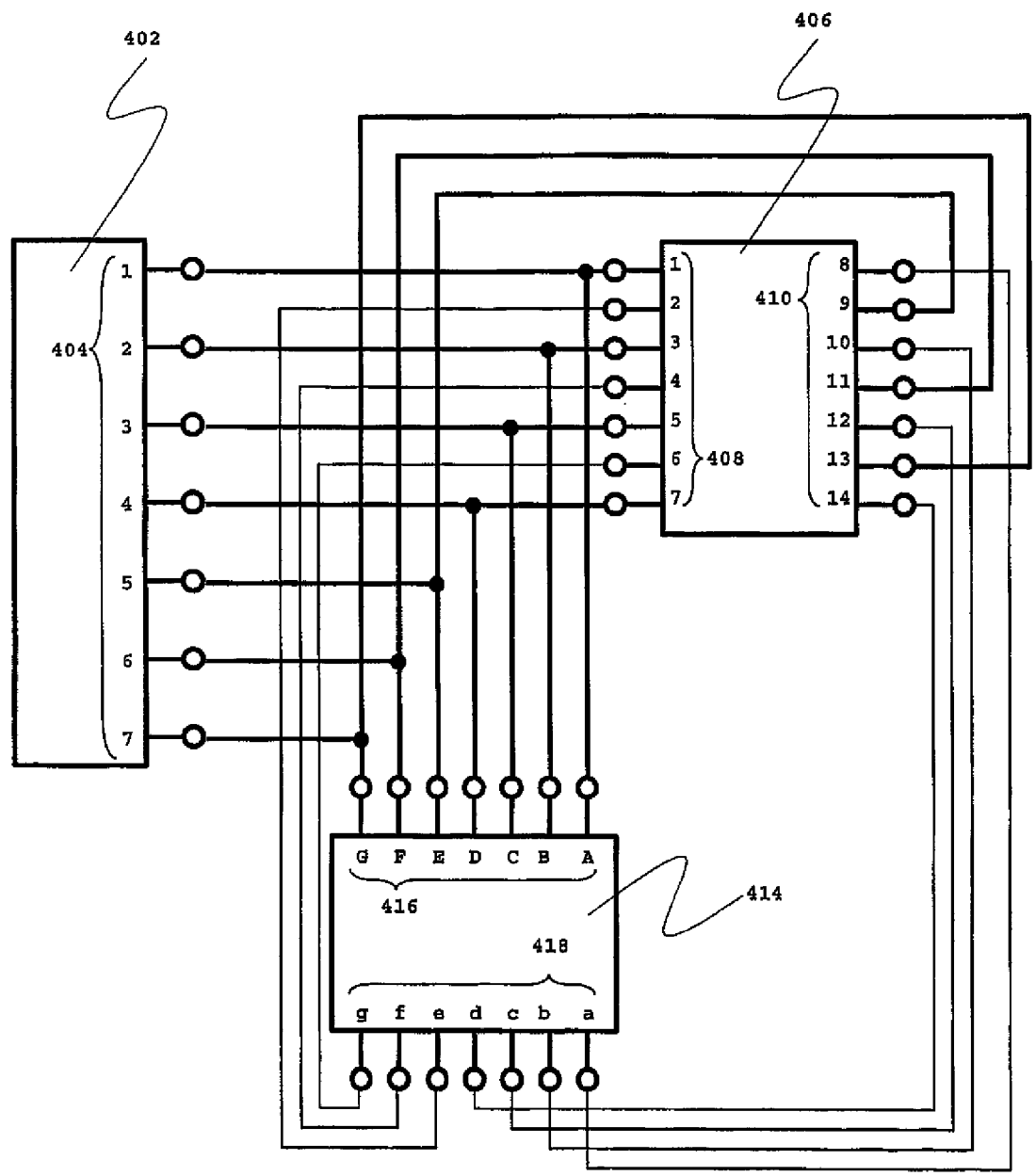
FIG. 17a is a prior art sub-system showing a multi phase generator and inverter, connected via a switch, which may be used in the present invention.

Referring now to FIG. 17a, which shows a general schematic of the use of the switch to switch between mesh connection span values, a multi-phase generator 406 is connected to a multi phase inverter 402. Generator 406 is mesh connected via switch 414. In order better to exemplify the present invention, multi-phase generator 402 and inverter 406 are each shown as having seven phases; this is not intended to limit the scope of the possible mesh connections, and multi-phase generators and inverters having values for phase number of other than seven are contemplated. The seven-phase generator 406 may be considered to consist of seven individual single-phase windings. In a rotating electrical machine, each phase winding set can be described by two terminals. There may be a larger number of S terminals, but these are always grouped in series or parallel groups, and the entire set can be characterized by two terminals. In a mesh-connected machine, these two terminals are connected directly to two different supply points. Each generator winding phase has two terminals, represented in FIG. 4a by the terminal set 408 labeled 1-7 and the terminal set 410 labeled 8-14. In the generator 406, the phase windings are present, but in FIG. 17a, only their two terminals are shown, so that terminals 1 and 8, of generator 406 are actually the terminals of the same winding, as are terminals 2 and 9 the two terminals of the same windings, etc. (for the sake of clarity, the individual windings are not shown in FIG. 17a). Describing the winding phases as having even-numbered (410) and odd-numbered (408) terminals is not intended to limit the scope of the present invention, but instead to illustrate how connections are made. It is to be understood that the terms "even-numbered" and "odd-numbered" are interchangeable, and that "odd-numbered" may be used instead of "even-numbered" and vice versa. Each terminal of the set of odd numbered terminals 408 is connected to another terminal of the set of even numbered terminals 410 via a switch 414 to form a mesh connection.

Switch 414 has two sets of terminals 416, labeled A-G, and 418, labeled a-g. The switch alters how the odd numbered terminals and the even numbered terminals of the generator 406 are connected to each other, and thereby sets the skip number, S.

Terminal 1 of inverter phases 404 and terminal 1 of generator 406 and terminal A of terminal set 416 of switch 414 are all directly connected to each other. Also, terminal B of generator 406 is directly connected to terminal a of terminal set 418 of switch 414. However, switch 41 may be used to alter the connectivity between sets 416 and 418, such as A being connected to b, or to c, or to d, thereby altering the value for S. Note that if A of 416 were to be connected to terminal a of terminal set 418, then the two terminals of the same winding of the generator 406, ie, terminal 1 of set 408 and terminal 8 of set 410, would be connected to one another, with a voltage difference of zero, effectively being short-circuited. Under most normal operating conditions, this position of the switch would not be used, and its selection would be prevented.

Thus it may be seen that connections are made to terminal set 416 in a sequence, and the sequence is phase angle order. In this disclosure, the order is ascending order, but descending order is also within the scope of the present invention. The operation of the switch shifts the sequence, but does not change the relative order of the connections. Many switch types are available which are able to shift the connectivity described above. For example the switch may be a rotary switch or a slider switch; it may be mechanical or electronic. The switch may be described as an N-pole N-way switch, in which all of the N poles share the same set of ways, and that each pole goes to one way at a time, and that by rotation or sliding different poles are connected to different ways, always keeping the same relative order. The switch may have an interlock to prevent selection of the A to a option.

Figure 17B:
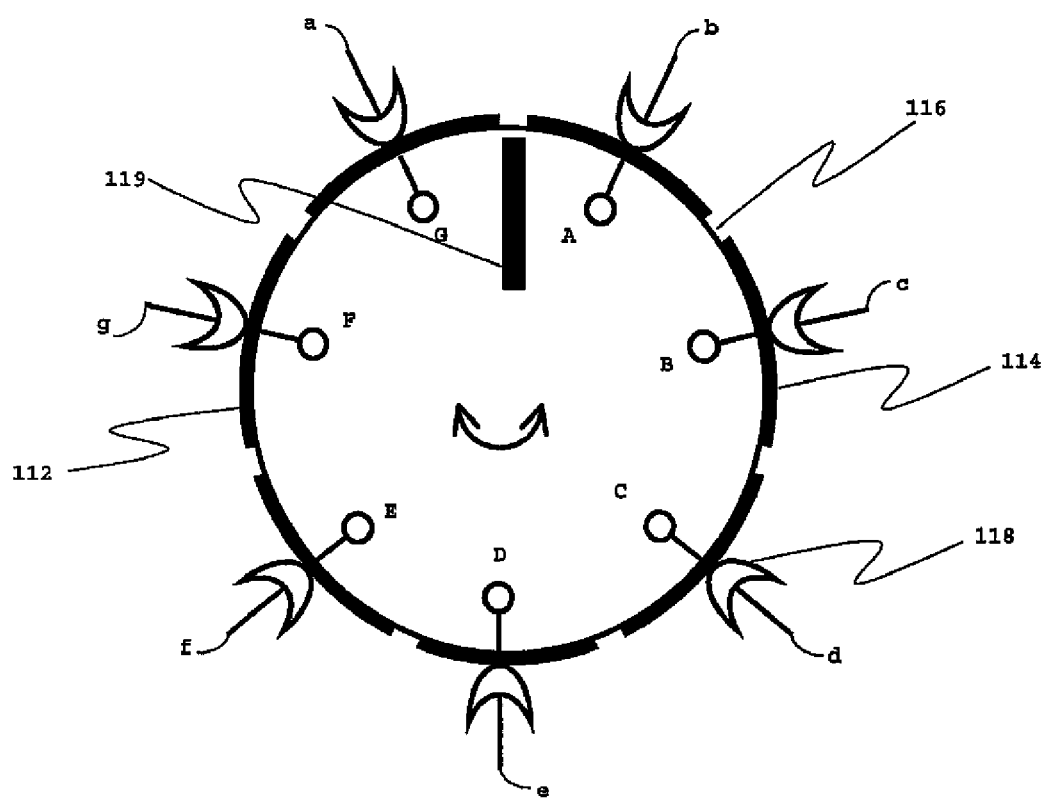

Switch 414 of FIG. 17*a* may be any type of switch that is capable of altering the mesh connection in the manner disclosed. One example of a rotary switch embodiment of switch 414 is shown in FIG. 17*b*, which shows a circular or cylindrical rotor 112 having fixed electrical terminals A to G.

These are electrically connected to contact areas 114 on the outside surface, which are separated from each other by an insulating region 116.

Cylindrical rotor 112 is rotatable around its axis in either a clockwise or anticlockwise direction. A further set of terminals a to g contact areas 114 via wipers, brushes, cable, braid, or other flexible means 118. Thus terminal A is connected to terminal b. This is the S=0 configuration. If the switch is rotated one place clockwise, then the S=1 mesh connection is obtained. To prevent the A to a and B to b, etc connection, a stop 119 is used. Such a segmented cylinder, in which there is a plurality of segments insulated from one another, is akin to the commutator of a brush DC motor, the details of which are well known in the art. Similarly, the contact points or brushes are well known in the art. This contactor arrangement is capable of coupling each second terminal of each single phase winding in turn to the various output terminals of the inverter, with each rotational position of the segmented cylinder giving a different mesh connection.

Variations of this arrangement are possible: a set of ordered winding terminals can be arranged in a first circle, and the terminals of the ordered phases of a second device arranged in a second circle; the two circles are concentric to one another and the terminals of the first device are positioned to contact the terminals of the second device. Means to rotate one of the circles to selectively connect the second set of ordered winding terminals of the first device with the ordered terminals of the second device are provided.

FIG. 15 shows various ways in which this mesh connection can be produced, in which the lines 1 represent the stator windings in a 9 phase machine, and dots 2 represent the inverter phases. Each stator winding has two ends, which are each connected to a different inverter phase. For example, FIG. 15*b* shows the S=0 connection in which the two ends of each stator winding are connected to adjacent inverter phases. FIG. 15*c* shows the S=1 connections, in which the two ends of each stator winding are connected to inverter phases with a skipped sequential inverter phase between them. As will be noted, each inverter phase is connected to two stator winding ends, but not two ends of the same winding. Each of these different mesh connections, S=1, S=2, etc, represent a different impedance within the machine.

Figure 16A:
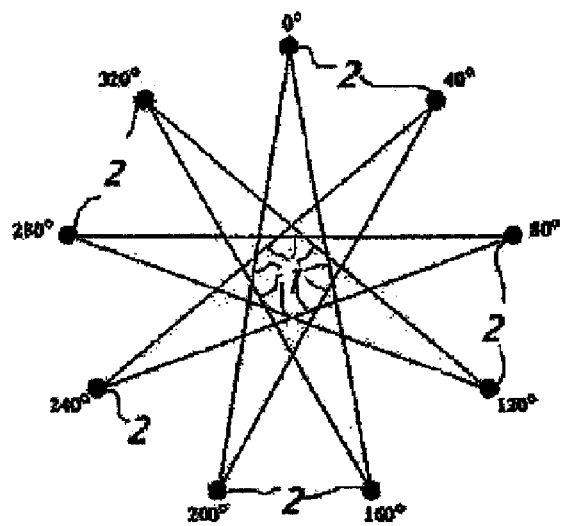
FIGS. 16a-d illustrate how winding terminals of a motor connected to a polyphase inverter in a particular fashion may be driven by the inverter with various phase angles.
Figure 16B:
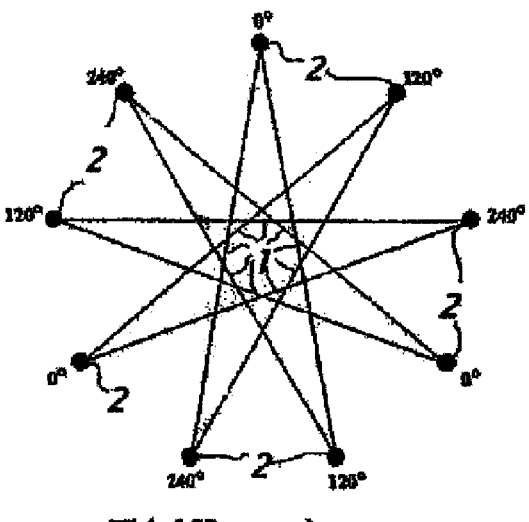
Figure 16C:
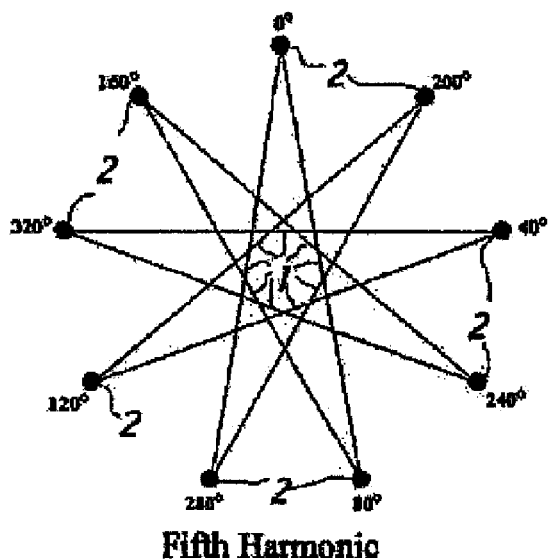
Figure 16D:
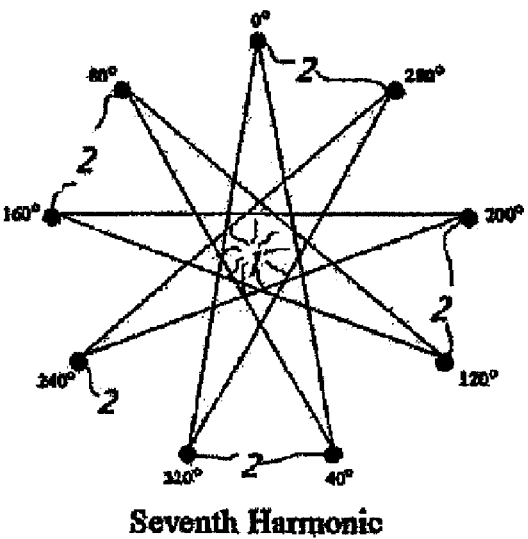
Figure 18A:
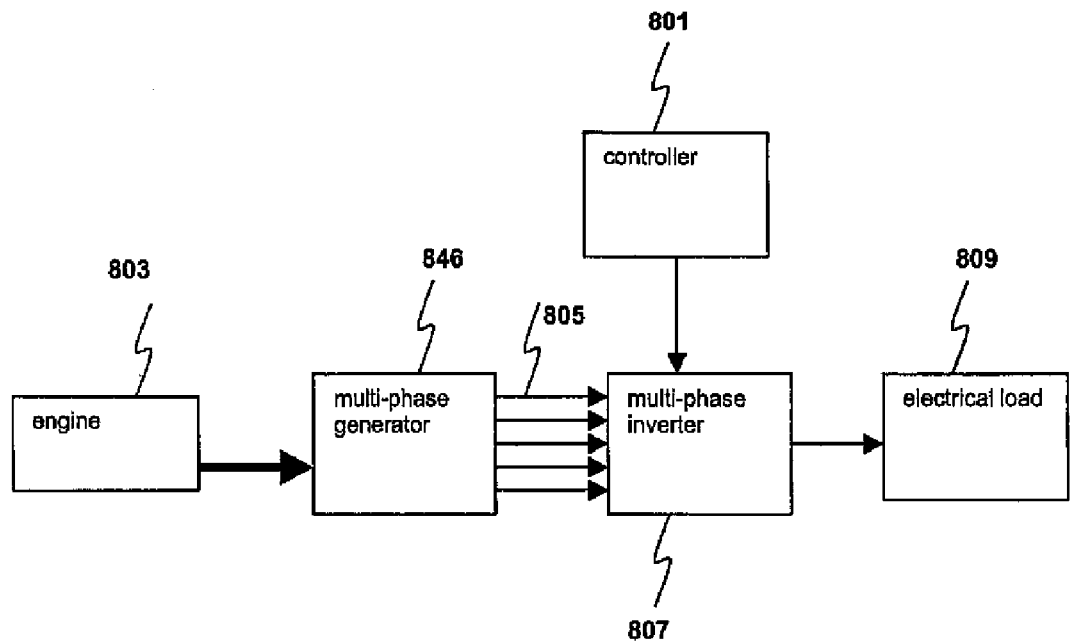
FIGS. 18a-c show various operational features of a second embodiment of the present invention.

In this embodiment, there are two distinct methods with which to change the torque load on the engine. In a first method, an AC machine is wound with stator windings connected to inverter phases with a particular mesh connection. In order to produce a desired torque load on the engine, a control acts to substitute or superimpose higher order harmonics to the electrical waveform, as shown graphically in FIG. 18*a*. FIG. 18*a* shows an engine 803, supplying mechanical power to a multi-phase generator 346. The multi-phase generator 346 has multiple electrical output phases 805, connected to inverter phases of multi-phase inverter 807. Multi-phase inverter 897 has its electrical characteristics is controlled by controller 801. The electrical output of the multi-phase inverter 807 is fed to electrical load 809. The controller 801 causes the inverter to synthesize, as required, current of fundamental waveform or of higher order harmonic waveform, either superimposed upon the fundamental waveform, or instead of the fundamental waveform. FIG. 16 show a sample 9 phase configuration wound with the S=3 connection of FIG. 15*e*, with different harmonic order waveforms being synthesized by the inverter; FIG. 16*a* shows the electrical angles at the inverter phases for synthesis of fundamental waveform current, FIG. 16*b* shows the electrical angles at the inverter phases for synthesis of $3^{rd}$ harmonic waveform current, FIG. 16*c* shows seventh harmonic and FIG. 16*d* shows $9^{th}$ harmonic.

In FIG. 16*a*, which shows the fundamental waveform current flowing through the generator windings, the difference in electrical degree between the two terminals of each of the 9 generator phase windings is 160 degrees. In FIG. 16*b*, with the third harmonic the difference in electrical degree between the two terminals of each winding is 120 degrees, in FIG. 16*c*, showing the fifth harmonic, the difference is 80 degrees, and in FIG. 16*d*, showing the seventh harmonic, the difference is only 40 degrees. The electrical angle difference between the two terminals of each winding represent the voltage flowing through the machine, relative to the current. Therefore, these different harmonics flowing through the mesh connected winding act to vary the impedance of the machine, effectively changing the current/voltage characteristics of the generator. In terms of mechanical power, the torque-load/speed characteristics of the generator are directly related to its current/voltage characteristics.

Figure 18B:
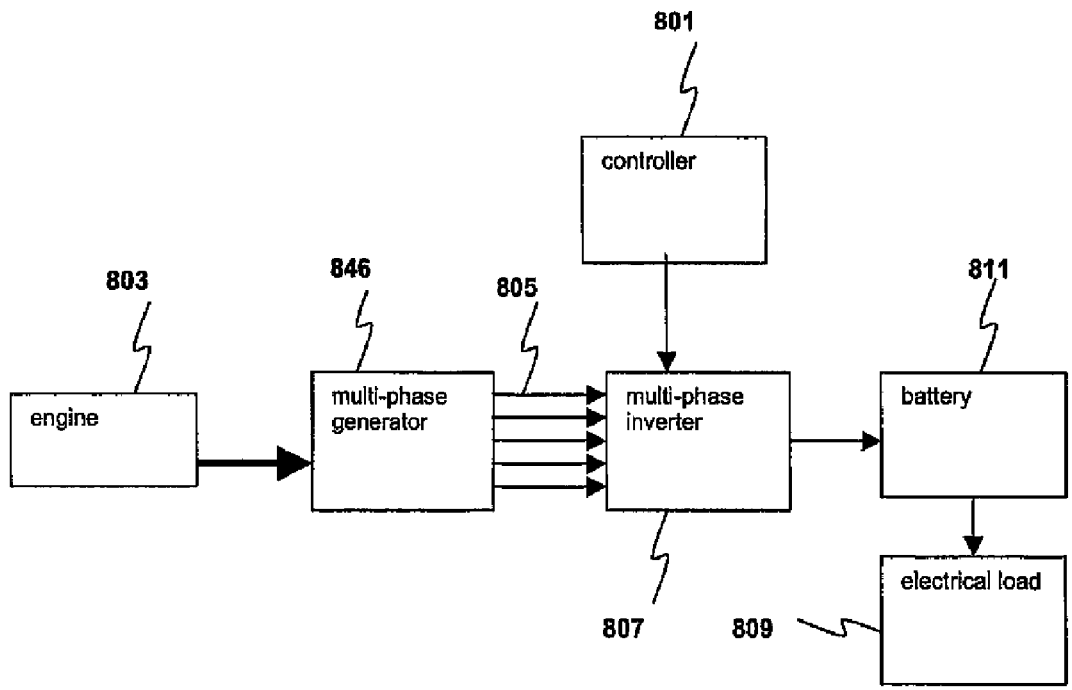

Switching between various harmonics when using a generator with windings mesh connected to inverter phases, in this case when the voltage is not directly changeable because it is directly related to engine output speed, will cause instead the torque load of the generator to the engine to be changed. Since the switching between harmonics causes changes in the torque load of the generator, this switching can be used to control the speed of the unthrottled engine. In this way, torque load changes take place in the generator itself. A variation on this embodiment, further including a battery 811, is shown in FIG. 18*b*. Several improvements are provided with this addition. The battery 811 enables the electrical load 809 to draw power at a steady voltage from the battery 811 instead of having to take the power with the varying current/voltage characteristics that the inverter 807 is synthesizing in order to control the engine speed. Also, the battery enables an increased power requirement to be met immediately, without waiting for the engine 803 to speed up, while the engine 803 gradually speeds up and replenishes the battery 811. Furthermore, during periods in which there is a power increase requirement, then if the battery 811 has sufficient spare electrical power, the controller 801 can set the inverter to synthesize harmonics that cause the generator 846 to operate as a motor, drawing power from the battery 811 and feeding it to the engine 803. This enables speedy startups and engine speed changes. If the electrical load requires AC input, a transformer or second inverter may be required between the battery 811 and the electrical load 809.

In a second method, the stator windings of an AC rotating machine, preferably but not limited to, an induction machine, are connected with a mesh connection, to inverter bridges, as described in the background section above. However, the mesh connection is made via a switch, such as in FIGS. 4*a* and 4*b*, and the skip number S of the mesh connection can be changed by changing the switch position, to change the impedance of the generator.

Each of the different switch positions represent a different mesh connection, with a different machine impedance. Machine impedances represent the change in voltage/change in current characteristics of the generator. Controlling the impedance therefore means controlling the current/voltage characteristics of the generator, which are directly linked to the torque-load/speed characteristics that the generator applies to the engine. By altering the switch position therefore, one may control the torque/speed characteristics of the load, and control the unthrottled engine's output, according to a power output requirement.

Figure 18C:
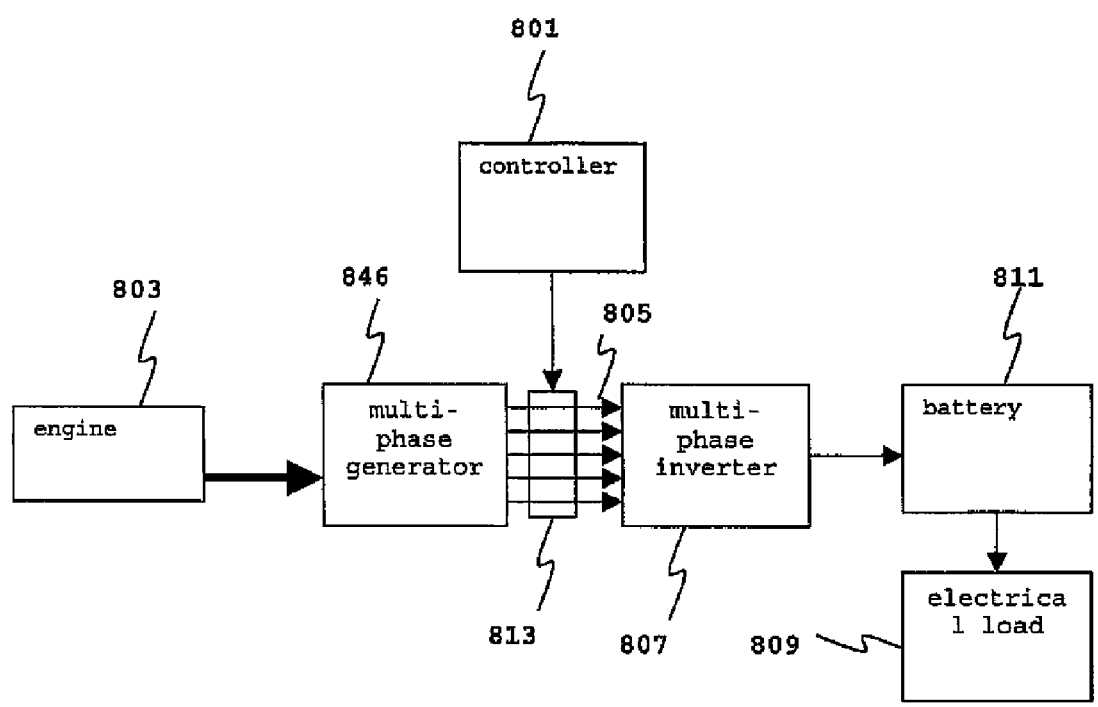

Operation of the system is shown in FIG. 18c. An unthrottled engine 803 provides mechanical power to a generator 846. The output terminals of the generator 846 are connected to one another with an adjustable mesh connection of switch 813, such as the one shown in FIGS. 17a and 17b. The controller 801 controls the position of this switch to create a desired impedance according to a power output requirement. The mesh connected windings 805 are connected to inverter 807. Optionally, inverter 807 may also synthesize harmonics to further vary the impedance of the machine according to the power output requirement, and to achieve more accurate control over the unthrottled engine. Alternatively, the inverter 807 may use only fundamental phase waveform. Battery 811 may be used to temporarily store electrical power produced by the generator 846, and also may used, as in the previous embodiments, to source power for the generator, to be operated as a motor to actively help the engine to speed up during periods of increase power requirements; as well as to absorb power surges into during periods immediately following a decreased power requirement of the electrical load, without the load having to receive a surge of power during these periods.

The two methods, of synthesizing harmonics, and of switching between mesh connections of different skip numbers S, can be used in isolation or in combination. When used in combination, the range of control over the engine may be enhanced.

The above is a description of a single cylinder diesel engine coupled to an electric generator, and a battery, and operated by an electric control. While this description includes many specifics, these, and other descriptions disclosed above, should not be construed as limiting the scope of the invention in any way. For example, the diesel engine, mentioned in the model above, may be replaced with another heat engine equipped with any number of cylinders, or an Otto cycle engine, or a four-cylinder gasoline engine. The engine may or may not be equipped with a turbocharger or an electric supercharger, depending on the manufacture preference. More than one engine may be used to drive the generator, for example, when two very different load modes may require an additional temporary power input, to supply the high load mode. In fact the invention is directed to a prime mover, which may or may not be an engine at all. For example, a water turbine in a dam could utilize the present invention as its control technique, as could other prime movers. It is only for clarity in reading that the prime mover has been referred to almost throughout this specification as an engine, and more specifically, as a heat engine.

The method of the present invention controls the prime mover "fuel" consumption by the motion of the prime mover. Thus, the present invention is suitable for internal combustion engines, pressure operated reciprocating engines, turbine systems over restricted speed ranges, etc. As an example of a system for which the method of the present invention is unsuitable, one may consider a wind turbine, in which the wind blows weather power is being consumed or not. Similarly, a standard twin shaft gas turbine engine, in which the power output shaft is not directly connected to the compressor or fuel supply.

More than one generator may be coupled to the engine as a result of space requirements, separate operational need or other consideration. The engine may be coupled, in addition to the generator, directly to the load; for example, in a vehicle, the engine may be, in addition, coupled to the wheels. As in the model, any type of generator may be used for the conversion of the mechanical power to electrical power. Any type of generator that is capable of acting as a motor may be used in an embodiment that takes advantage of this capability. The present invention teaches how control could be effected without the need for throttle control. There are however embodiments in which a throttle would be part of the engine generator system, e.g., for shutdown, or as a safety device. Power electronic devices for the control and conversion of the electrical power are not limited to those listed, but may include any power electronic switches, including gas discharge devices, mechanical switches, silicon devices, and vacuum microelectronics devices. The extent of the control might range from the manipulation of the generator's output, through control over the generator's excitation levels, to the additional control over the engine's fuel and air intake. Operation is not limited to the ideal combination of engine speed, winding power and generator electric load, although the invention facilitates operation at such ideal parameters. Direct feedback of heat engine speed may be used to allow the power electronic control to anticipate power output corrections. In addition, other feedback parameters such as engine and winding heat, oxygen concentration in the exhaust path etc. may be collected, depending on the machine function, to reflect the difference between the given condition and the desired one. The power electronic control system may control system rate of speed change, as well as system speed. The power electronic control system may include predictive capability to anticipate future power requirements, and to select power output levels accordingly. The generator controller used to alter the synchronous speed of the generator according to the methods described may include standard field oriented control techniques, which allow the control of electrical machine torque versus speed relations.

While inherently stable embodiments have been described, in which small changes in system speed cause immediate changes in power consumption which restore the system to the desired equilibrium speed, such is not a necessary requirement. The requirement of equilibrium may be met through the use of unstable equilibrium, for example a DC generator supplying a constant power switching load. In such a case, active changes in load power consumption will be needed to maintain system speed, however the unstable nature of the engine/generator equilibrium may enhance the speed with which power output levels may be changed. There are also embodiments in which a further controlling step will prove necessary, to cause the engine and generator to be in an equilibrium state, so that the engine stops changing speed.

There have been described embodiments in which the focus is on the change of power output of the engine, via generator control. Another application of the present invention is with the use of an induction generator having a very high torque to speed relation around synchronous speed. Through this, the generator fluctuates between generating and motoring modes throughout the engine power production cycle itself. As a result, the engine never slows down dramatically during power absorbing strokes, to speed up again dramatically in power production strokes. In such an embodiment, used perhaps in a electricity generation unit, the generator may, or may not also provide control over the output of engine; indeed a throttle may be used to control engine power output.

Some embodiments may use a more limited and some a more expanded control depending on their specific needs. An energy storage unit, such as a battery, may or may not be used. The benefits from the use of the present invention are especially apparent when the invention is utilized in hybrid electric vehicles, heavy machinery and off grid electricity production.

The need for cleaner, more efficient drive means is well established in these fields. However, the benefits of the present invention are not limited only to these examples. In times when environment issues are in the interest of both the public and the legislator, cleaner and more efficient means to produce electrical power are clearly useful and have a great commercial potential.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

The invention claimed is:

1. A method for controlling an engine to meet a power output requirement, comprising the steps of:
    a) allowing the engine to run in an unthrottled condition;
    b) receiving a signal describing the power output requirement;
    c) varying a gear ratio of a transmission connected between a mechanical output of the engine and a mechanical load; and
    d) establishing a torque equilibrium between the load and the engine at an engine total power output level substantially equal to said power output requirement.

2. The method of claim 1 wherein said step of varying the gear ratio of the transmission comprises:
    a) maintaining a steady power output requirement by setting a gear ratio of the transmission to provide a torque load to the engine that is equal and opposite to a torque output of the engine;
    b) meeting an increased power output requirement by increasing a torque/speed gear ratio of the transmission; or
    c) meeting an decreased power output requirement by decreasing a torque/speed gear ratio of the transmission.

3. The method of claim 1 wherein said step of varying the gear ratio of the transmission comprises changing the gear ratio one gear at a time.

4. The method of claim 1 wherein said step of varying the gear ratio of the transmission comprises:
    determining whether a large gear ratio change or a small gear ratio change is necessary, and in the event that the large gear ratio change is required, varying the gear ratio by a group of gears at a time, until not more than the small gear ratio change is necessary.

5. The method of claim 4 additionally comprising the step of:
    comparing a signal describing a power output requirement to a power output of the engine, and wherein each application of the steps of varying the gear ratio by a group of gears at a time and varying the gear ratio one gear at a time additionally comprises the step of: waiting for a new torque equilibrium to be established.

6. The method of claim 1 wherein the step of varying the gear ratio additionally comprises the step of determining a substantially exact ratio whereby the torque equilibrium is established.

7. The method of claim 6 wherein the step of determining additionally comprises the step of using calculating or lookup techniques.

8. The method of claim 6 wherein a torque/speed characteristic of the engine is substantially linear or approximates to a curve, and wherein the step of determining the substantially exact comprises assuming that the torque/speed characteristic is exactly linear or exactly matches the curve.

9. The method of claim 1 additionally comprising the step of connecting an AC generator to the transmission, for outputting AC power to an electrical load.

10. The method of claim 9 further comprising the step of providing an energy storage unit and wherein said AC generator supplies electrical power to said energy storage unit, and an electrical load draws the electrical power from said energy storage unit.

11. The method of claim 9 wherein said electrical load comprising a fixed frequency electrical load with a steep current/voltage characteristic, and wherein said method further comprising the step of allowing the fixed frequency electrical load to draw current according to a voltage of the fixed frequency electrical load.

12. The method of claim 9 additionally comprising
    a) connecting electrical phases of the generator to an inverter with a mesh connection, and
    b) determining a generator current/voltage ratio at which a torque/speed characteristic of the generator would be in equilibrium with a torque/speed characteristic of the engine at substantially the required system power output, and
    c) implementing substantially that generator current/voltage ratio by using one or both of the following methods:
    i) switching the mesh connection to have a different skip number (S), and
    ii) superimposing or substituting temporal harmonics to the fundamental waveform of the inverter phases.

13. Apparatus for the control over the power output of an unthrottled engine, comprising
    a) a transmission, connected between a mechanical load and the unthrottled engine, comprising a variable gear ratio, and
    b) a controller, for controlling a torque load on the engine, according to a changeable required power output, comprising
    i) means for determining the torque output of the unthrottled engine at the achievement of a required power output, and
    ii) means for setting the gear ratio of the transmission to produce a torque load on the engine substantially equal in magnitude to the torque output of the unthrottled engine at the achievement of a required power output, whereby the unthrottled engine will reach an equilibrium with the mechanical load at substantially the required power output.

14. The apparatus of claim 13 wherein said transmission is a continuously variable transmission.

15. The apparatus of claim 13 wherein the controller comprises means to determine and set a substantially exact gear ratio required to produce said required power output.

16. The apparatus of claim 13 wherein said means for determining the torque output of the unthrottled engine at the achievement of a required power output comprising determining whether the torque output of the unthrottled engine at the achievement of a required power output is greater than or less than transient engine torque output.

17. The apparatus of claim 13 wherein said mechanical load is a generator, connected to a battery.

* * * * *